US011839778B2

(12) United States Patent
Koeger et al.

(10) Patent No.: US 11,839,778 B2
(45) Date of Patent: *Dec. 12, 2023

(54) MODULAR NBC FILTRATION SYSTEM FOR PROTECTION SHELTERS

(71) Applicant: BETH-EL ZIKHRON YAAQOV INDUSTRIES LTD., Zikhron Yaaqov (IL)

(72) Inventors: Samuel Koeger, Zikhron Yaaqov (IL); Jonathan Schneider, Zikhron Yaaqov (IL)

(73) Assignee: BETH-EL ZIKHRON YAAQOV INDUSTRIES LTD., Zikron Yaaqov (IL)

(*) Notice: Subject to any disclaimer, the term of this patent is extended or adjusted under 35 U.S.C. 154(b) by 422 days.

This patent is subject to a terminal disclaimer.

(21) Appl. No.: 17/287,288

(22) PCT Filed: Apr. 1, 2019

(86) PCT No.: PCT/IL2019/050376
§ 371 (c)(1),
(2) Date: Apr. 21, 2021

(87) PCT Pub. No.: WO2020/100132
PCT Pub. Date: May 22, 2020

(65) Prior Publication Data
US 2021/0393994 A1    Dec. 23, 2021

(30) Foreign Application Priority Data
Nov. 13, 2018  (IL) .......................................... 262997

(51) Int. Cl.
*B01D 46/00*    (2022.01)
*A62B 13/00*    (2006.01)
(Continued)

(52) U.S. Cl.
CPC .............. *A62B 13/00* (2013.01); *A62B 23/04* (2013.01); *B01D 46/0005* (2013.01);
(Continued)

(58) Field of Classification Search
CPC . C02F 1/36; C02F 1/463; B01D 53/04; B01D 46/4272; A62B 23/04
See application file for complete search history.

(56) References Cited

U.S. PATENT DOCUMENTS 11,033,761 B2 * 6/2021 Koeger .................... E04H 9/04
2021/0178197 A1 * 6/2021 Koeger .................... F16H 7/00

FOREIGN PATENT DOCUMENTS

| IL | 244631 | 3/2016 |
| WO | 2018/015943 | 1/2018 |
| WO | 2020/031169 | 2/2020 |

* cited by examiner

Primary Examiner — Sharon Pregler
(74) Attorney, Agent, or Firm — The Law Office of Joseph L. Felber

(57) ABSTRACT

An NBC filtration system whose main components are a filter unit, a blower, a manual air exchange backup unit and a changeover valve. The filter unit is elongated horizontally positioned along a top portion of a wall of the protected space. Inlet and outlet ports of the filter unit are located close to each other near a first extremity of the filter unit. The blower is driven by the electric motor through a second speed increasing transmission enabling rotation of an impeller of the blower. The blower is positioned along the filter unit near a second extremity distal from the inlet and outlet ports; The changeover valve has a tubular housing extending along the filter unit near the first extremity, and an internal displaceable tubular valve member. Each of the components may be replaced with a component of different capacity without effecting the other components.

21 Claims, 17 Drawing Sheets

(51) Int. Cl.
    *F24F 8/10*           (2021.01)
    *F24F 7/003*         (2021.01)
    *A62B 23/04*        (2006.01)
    *B01D 46/10*         (2006.01)
    *B01D 46/42*         (2006.01)
    *B01D 46/44*         (2006.01)
    *B01D 53/04*         (2006.01)

(52) U.S. Cl.
    CPC ..... *B01D 46/0036* (2013.01); *B01D 46/0049* (2013.01); *B01D 46/0087* (2013.01); *B01D 46/10* (2013.01); *B01D 46/4245* (2013.01); *B01D 46/4272* (2013.01); *B01D 46/444* (2013.01); *B01D 53/04* (2013.01); *F24F 7/003* (2021.01); *F24F 8/10* (2021.01); *B01D 2273/30* (2013.01); *B01D 2279/35* (2013.01)

MODULAR NBC FILTRATION SYSTEM FOR PROTECTION SHELTERS

FIELD OF THE INVENTION

The present invention relates to a near ceiling mounted, NBC filtration system for collective protection shelters.

BACKGROUND OF THE INVENTION

In Israel, public constructions such as office buildings, shopping malls, industrial facilities, entertainment centers and the like, must preserve an NBC protected space for use at emergency. The protected space should include an NBC filtration system. The preserved space may be used for other periodical purposes at normal times. Commonly the space is used as meeting or waiting rooms that do not require heavy furniture and can be rapidly cleared during an emergency event. Due to the high cost per square meter of floor-space in such buildings, it is desired that the NBC filtration system would take up minimal space.

The regulations indicate that such public NBC filtration system should include a filter unit composed of a particulate filter and a gas adsorption filter, and an electric blower appropriate for certain rate of air exchange. Furthermore, the NBC filtration system should have an air exchange backup unit energized by human power, including a human power interface such as a hand crank for manual operation in an event of power failure. The air exchange backup unit introduces fresh air into the protection shelter using human power instead of electric power if such is not available. Typically, the air exchange backup unit includes a speed increasing transmission having an input shaft manually rotated by the hand crank and an output shaft engaged to rotate the electric blower.

Additionally, there is a need to change the NBC filtration system state, between a ventilation mode effective during normal times or conventional hazard and NBC protection mode effective during NBC hazard.

The term NBC, standing for "Nuclear Biological Chemical", is used here at the broad interpretation, meaning one or more of: Nuclear, Biological, Radiological and Chemical. Accordingly not all of the capabilities are necessarily implemented in a filtration system. For example a filtration system providing Biological and Chemical attack protection, but none or only partial Nuclear attack protection, is yet considered an NBC filtration system.

Israeli patent application 244631 discloses a ventilation and filtration system for a security room, including: a blower to blow air to ventilate the security room, an air filter that is connectable to the blower to filter the air, a housing within which the air filter and the blower are enclosable, and a mechanism for raising the housing to a storage position at the ceiling of the security room so as to enable utilization of a space beneath the housing, and for lowering the housing to an operating position at the floor of the security room.

The suggested solution however is cumbersome and requires lowering of the entire filtration system in an event of emergency. The entire system weight may reach 100 kg, and the lifting and lowering mechanism which must enable easy operation for an average person becomes complicated by itself.

Israeli patent application 246827 to the present applicant, also published as PCT/IL2017/050747 describes a floor-space saving and general space saving, simple to operate NBC filtration system for collective protection shelters. According to IL application 246827, the NBC filtration system is contained in a space located out of a comfortable reach of the shelter occupants thus saving usable floor-space, while the means for activation and for changing the NBC filtration system state are operated from a location within the comfortable reach of the shelter occupants. The application also suggests basic constructional options for implementation of the invention.

The above mentioned IL application 246827 solves the space problem by implementing high integration of the different components of the filtration system. Such high integration requires specific system design for each airflow capacity or installation type. As a result, systems intended for protecting 8, 15, 30, 50 and 100 occupants, needs a complete redesign of the entire system for each size of the airflow capacity range. Additionally, right hand or left hand installations as sometimes required for reason of physical space restriction, is limited as well. An aesthetic appearance also becomes a requirement even in public buildings, since the protected space is normally used for other purposes. Furthermore the solutions provided in IL application 246827 are principal, while more specific constructional implementations are required.

Israeli patent application 261094 to the present applicant, discloses a near ceiling mounted NBC filtration system of collective protection shelters comprising a filter unit, a blower, and an air exchange backup unit. The air exchange backup unit comprising: a plurality of hinged segments serially linked to each other to form a foldable arm. A first end of the air exchange backup unit is swiveably attached to an electric motor driving a blower. And a second end of the air exchange backup unit carries a detachable hand crank. Manual rotation of the hand crank rotates a shaft of the electric motor at substantially a rated speed of the electric motor. The second end of the air exchange backup unit is firmly attachable to a wall of the protection shelter at a convenient position for manual cranking of the hand crank. The air exchange backup unit is selectively folded up at normal times.

The above described IL application 261094 specifically deals with the air exchange backup unit and the unique structure thereof. The present invention may make use of the described air exchange backup unit as a component of a modular NBC filtration system.

Accordingly there is a need to further optimize and detail the prior art systems in order to provide an NBC filtration system that is modular, aesthetic, efficient in production, simple in installation and low in manufacturing cost.

SUMMARY OF THE INVENTION

Consequently, it is a principal object of the present invention to overcome the disadvantages and limitations of prior art systems and provide an optimized structure of an NBC filtration system for collective protection shelters. The proposed optimized structure provides high integration of the various elements of the filtration system while implementing modular construction of standard building blocks. As a result filtration systems of different airflow capacities can be easily assembled and production simplified. Additionally, most of the mechanical elements are not visible to occupants of the shelter being hidden behind an aesthetic filter unit and an optional peripheral cover. The optimized structure is a result of long research and development process made by the applicant.

According to an embodiment, there is provided a modular, near ceiling mounted, NBC filtration system for protection shelters comprising:

a) A filter unit elongated in shape, horizontally positioned along a top portion of a wall of the protection shelter, The filter unit is provided with an inlet port and an outlet port located in proximity to each other near a first extremity of the filter unit.
b) A blower driven by an electric motor. The blower is positioned along the filter unit near a second extremity thereof distal from the inlet port and outlet port.
c) A manual air exchange backup unit comprising a plurality of hinged segments serially linked to each other, forming a foldable arm. A first end of the air exchange backup unit is swiveably attached to the electric motor and a second end of the air exchange backup unit carries a detachable hand crank. The air exchange backup unit is selectively folded up at normal times. And
d) a changeover valve, selectively airflow coupling the filter unit and the blower, the changeover valve comprising: a tubular housing extending along the filter unit near the first extremity of the filter unit, an internal longitudinally displaceable tubular valve member, and a state selector handle for displacing the tubular valve member thus switching the changeover valve between ventilation and filtration states.

According to an aspect of the invention, each of the four main elements composing the NBC filtration system may be replaced by an element of the same functionality having a different capacity, without effecting the other elements.

According to another aspect, the inlet port and outlet port of the filter unit are facing the wall of the protection shelter such that a visible face of the filter unit has a neat aesthetic appearance.

According to yet an additional aspect, the blower, the manual air exchange backup unit and the changeover valve are located between the filter unit and the wall of the protection shelter, thus being invisible to the shelter occupants.

According to one aspect, the filtration system further comprises a status indicator interface configured to exhibit an airflow-rate of the blower, and an adjustment knob configured for electronically tuning a rotational speed of the motor.

According to one aspect, a primary outlet of the changeover valve is airflow coupled to an inlet of the blower by an expandable duct.

Further disclosed according to an embodiment, is a method of operation of the filtration system. The method comprising one or more of the steps of:
a. Providing a near ceiling mounted NBC filtration system comprising: a filter unit positioned along a top portion of a wall of the protection shelter; a blower driven by an electric motor, the blower is positioned along said filter unit; an air exchange backup unit comprising a plurality of hinged segments serially linked to each other, forming a foldable arm, a first end of the air exchange backup unit is swiveably attached to the electric motor and a second end of the air exchange backup unit carries a detachable hand crank; a status indicator interface configured to exhibit an airflow-rate of the blower; an adjustment knob configured for tuning the speed of the motor; and a changeover valve, selectively airflow coupling the filter unit and the blower, the changeover valve comprising a state selector handle for switching said changeover valve between ventilation and filtration states.
b. Powering on the electric motor driving the blower in any event requiring entrance into the protection shelter.
c. Observing the status indicator interface and adjusting the adjustment knob if required. And
d. powering off the electric motor driving the blower, and leaving the protection shelter when back to normal or exit shelter is declared.

According to an aspect, the method may further comprise between steps c and d, one or more of the steps of:
e. Expanding the air exchange backup unit in an event of power failure, if the air exchange backup unit is not already expanded.
f. Attaching the second end of the air exchange backup unit to a wall of the protection shelter at a convenient position for manual cranking of said hand crank.
g. Attaching said detachable hand crank to said second end of said air exchange backup unit.
h. Cranking the hand crank while the power failure continues. And
i. observing the status indicator interface and adjusting the cranking speed of the hand crank if required.

According to an additional aspect, the method may further comprise after step i, one or more of the steps of:
j. Stopping the cranking operation when electric power is revived.
k. Detaching the detachable hand crank from the second end of the air exchange backup unit when back to normal or exit shelter is declared.
l. Detaching the second end of the air exchange backup unit from the wall of the protection shelter. And
m. folding up the air exchange backup unit.

According to another aspect, the method may further comprise between steps c and d, one or more of the steps of:
n. Switching the state selector handle to filtration state in an event of NBC hazard declaration. And
d. switching the state selector handle back to ventilation state when NBC hazard declaration is canceled, and only if no contamination detected.

BRIEF DESCRIPTION OF THE DRAWINGS

The invention and ways it may be carried out in practice, will be understood with reference to the following illustrative figures, by way of non-limiting example only, in which like reference numerals identify like elements, and in which.

DETAILED DESCRIPTION OF EMBODIMENTS

Several terms relating to the present invention will be defined prior to describing the invention in detail. It should be noted that the following definitions are used throughout this application.

For the purpose of the present invention, directional terms such as "top", "bottom", "below", "above", "left", "right", "horizontal", "vertical", "upper", "lower", "up", "down", etc. are merely used for convenience in describing the various implementations of the present invention. The assemblies demonstrating the present invention may be oriented in various ways.

For the purpose of the present invention, the term "plurality" refers to two or more than two.

For the purpose of the present invention, the term "hinged element" refers to an element provided with at least one hinge or having at least one hinge point enabling swivel of the element about the hinge point.

For the purpose of the present invention, the term "segment" refers to one of the parts into which an assembly is separates or is divided.

For the purpose of the present invention, the term "air exchange backup unit" refers to a device, energized by human power, configured for introducing fresh air into a protection shelter during an event of electric power failure.

For the purpose of the present invention, the term "foldable" refers to a structure that can be folded down into a small space when it is not being used.

For the purpose of the present invention, the term "inverted tooth chain" or "silent chain" refers to a type of chain with teeth formed on its links to engage with standard or modified gear wheels.

For the purpose of the present invention, the term "pitch" refers to the distance between successive corresponding physical occurrences, such as rollers in a roller chain.

The term "NBC" is used throughout this text as a general abbreviate for all kinds of hazardous agents or threats including any one of: Nuclear, Biological, Chemical, Radiological and any combination thereof. Such combinations may include for instance: NBC, CBRN, CBR, BC, B and C.

Figure 1:
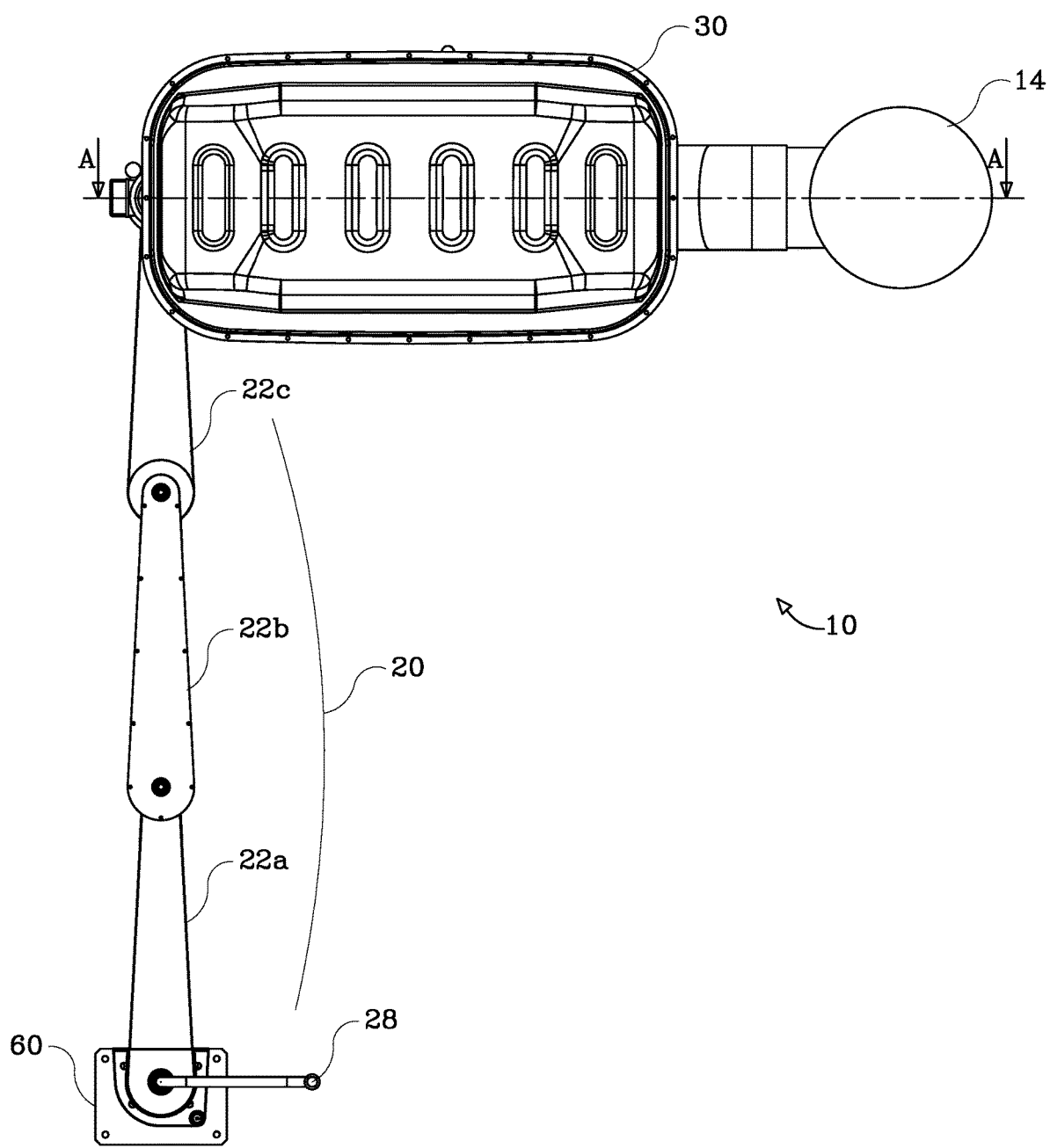
FIG. 1 is a front view of an NBC filtration system made according to an embodiment of the present invention.
Figure 2:
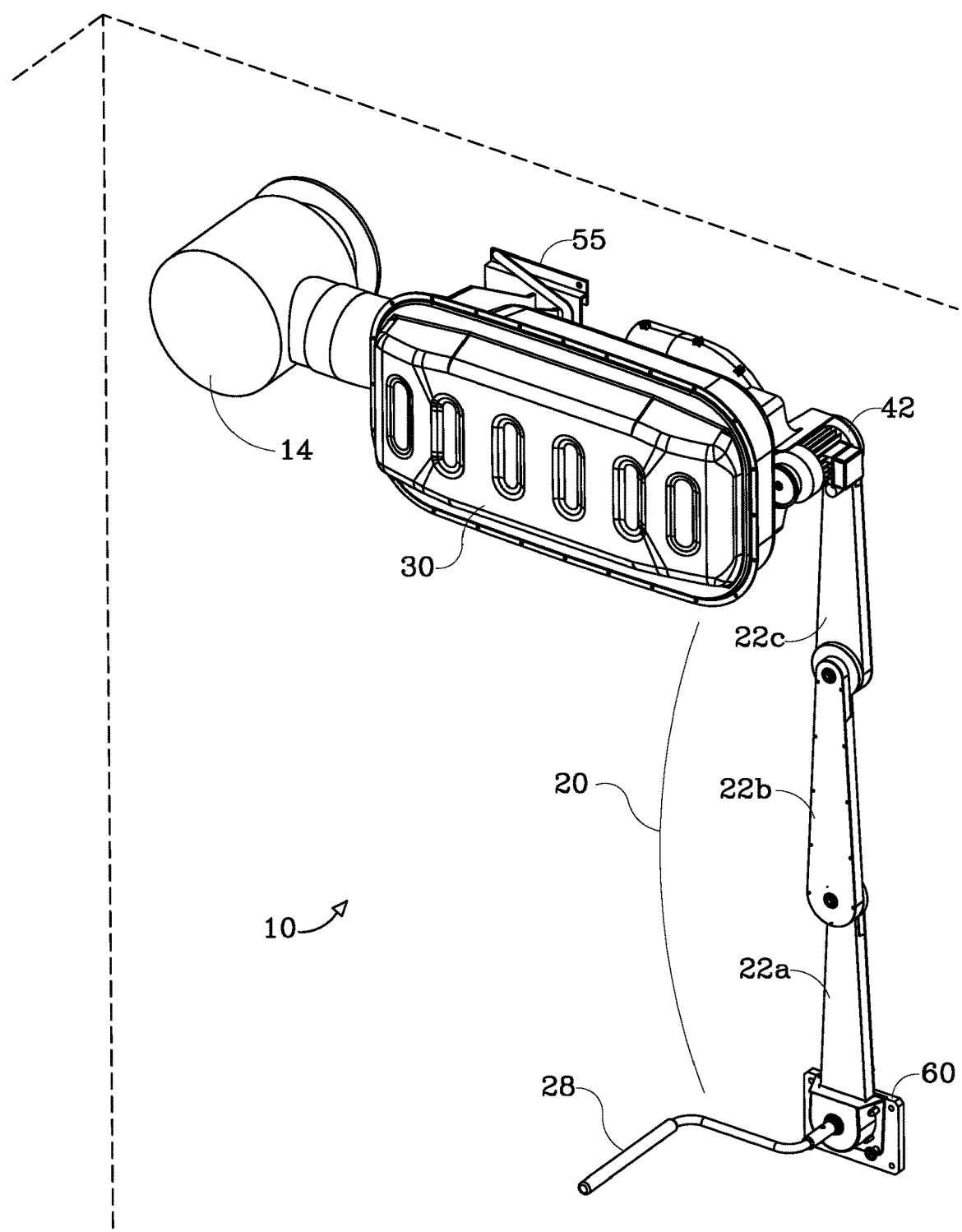
FIG. 2 is a perspective view of a different implementation of the NBC filtration system, shown in position on a wall of a protective shelter.

With reference to the figures, according to one embodiment of the invention, there is shown in FIG. 1, a front view of a near ceiling mounted NBC filtration system, generally referenced 10. FIG. 2 depicts a perspective view of an NBC filtration system with dashed lines representing nearby internal boundary of the protection shelter. It will be noted that the NBC filtration system of FIG. 1 is fitted in a first orientation while the NBC filtration system of FIG. 2 is fitted in an inverted orientation as will be further explained herein-below. Visible in FIGS. 1 and 2, are a prefilter 14, a filter unit 30 and an air exchange backup unit generally referenced 20.

Figure 6:
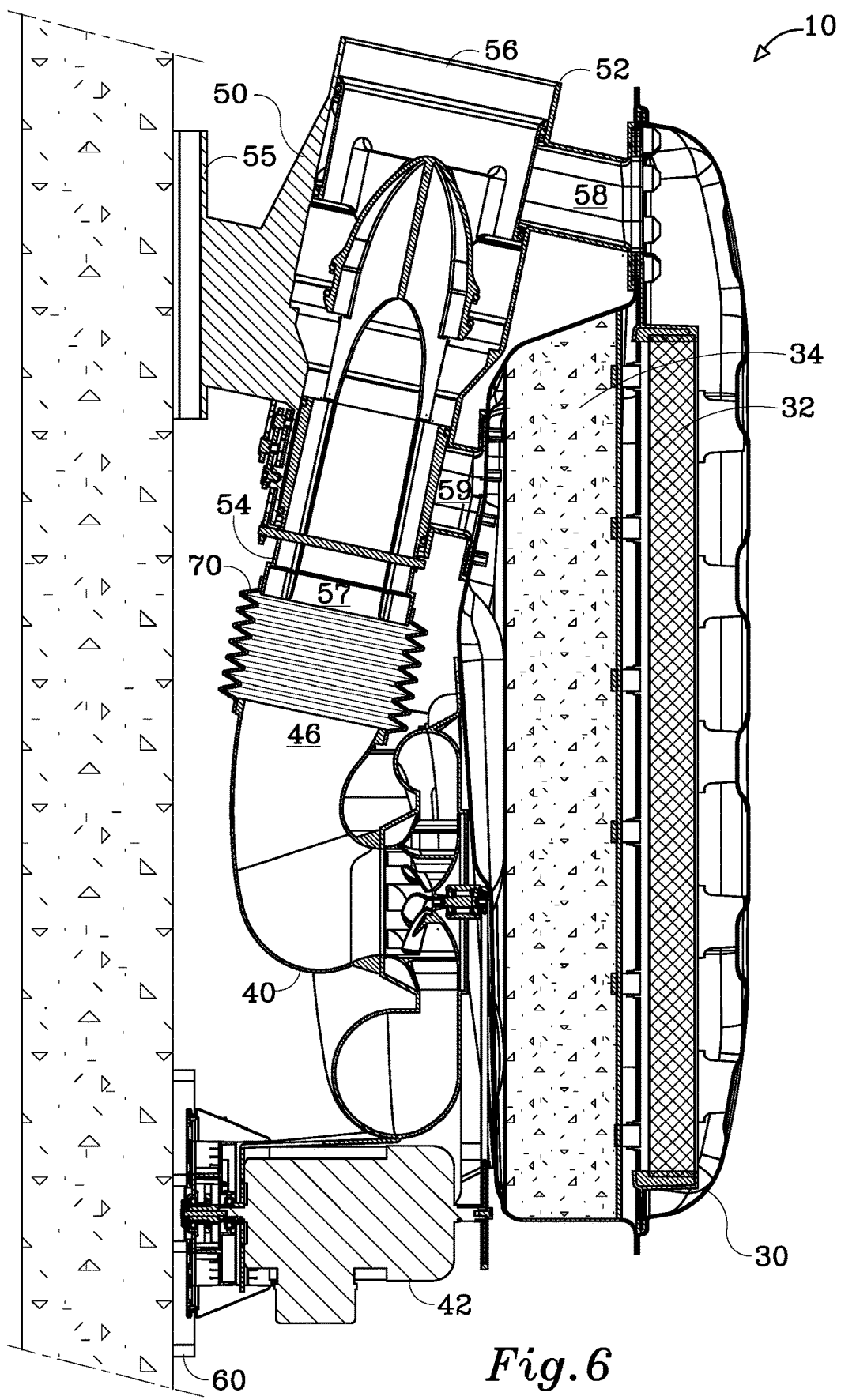
FIG. 6 is a sectional view taken along line A-A of FIG. 1.

The prefilter 14, intended to hold coarse particles, is fitted to an air intake embedded in the concrete wall of the building during construction. The air intake may further include a blast valve as known in the art. The filter unit 30 typically includes a particulate filter 32 (FIG. 6) and a gas adsorption filter 34 (FIG. 6). The air exchange backup unit 20 is configured for manual operation of a blower 40 (FIG. 4) in an event of power failure.

Figure 8:
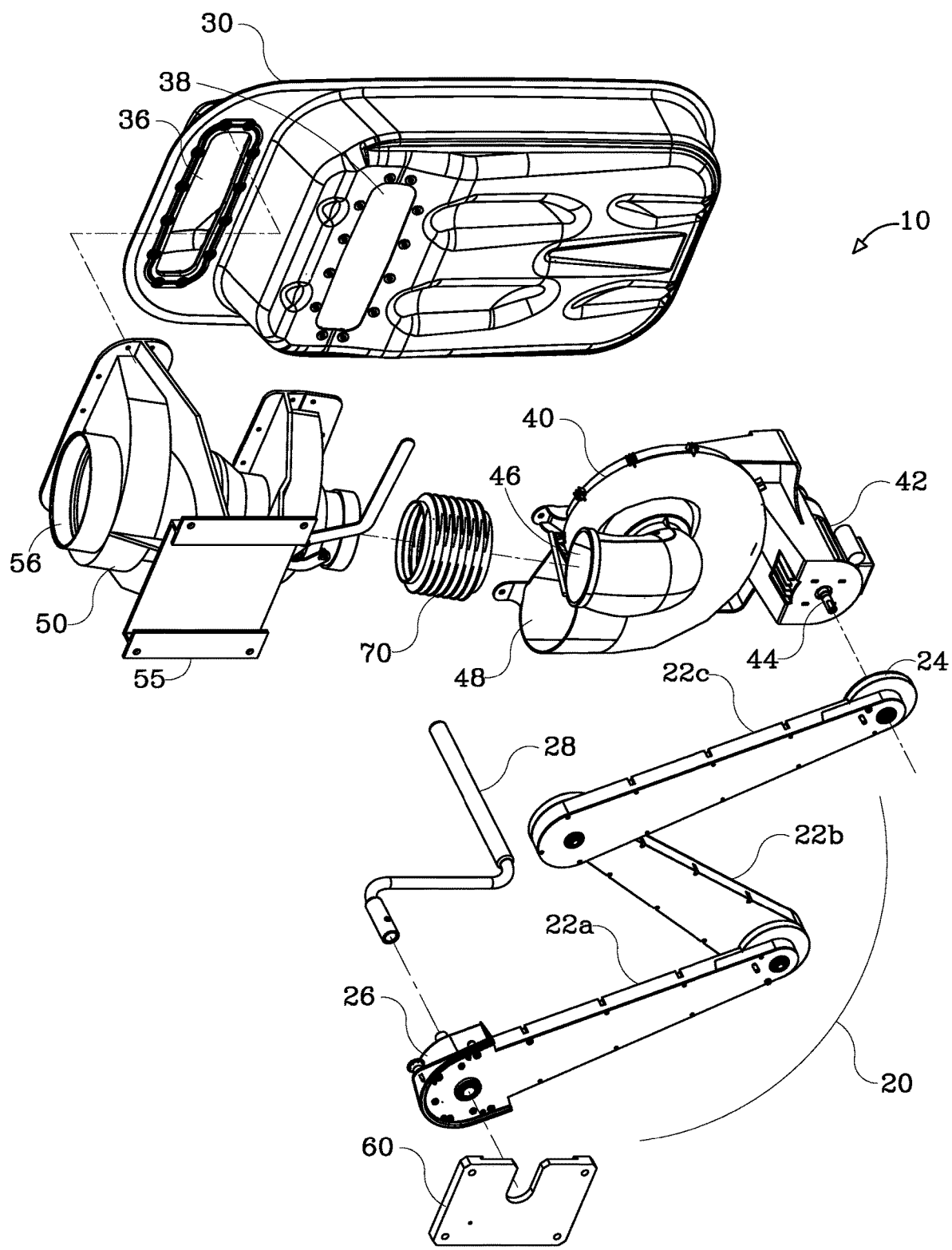
FIG. 8 is an exploded perspective view of the NBC filtration system shown in FIG. 4.

With reference to FIG. 8, there is shown an exploded rear view of the NBC filtration system 10, demonstrating the modularity of the system. As shown in FIG. 8, the NBC filtration system 10 comprises four main sub-assemblies: a filter unit 30, having an inlet port 36 and an outlet port 38, a blower 40 driven by an electric motor 42, a changeover valve 50 selectively airflow coupling the filter unit 30 and the blower 40, and an air exchange backup unit 20.

According to an embodiment, the air exchange backup unit 20 comprises a plurality of hinged segments 22(a, b and c) forming a foldable arm. The air exchange backup unit 20 may be folded up at normal times as will be explained in detail herein-below.

Figure 15:
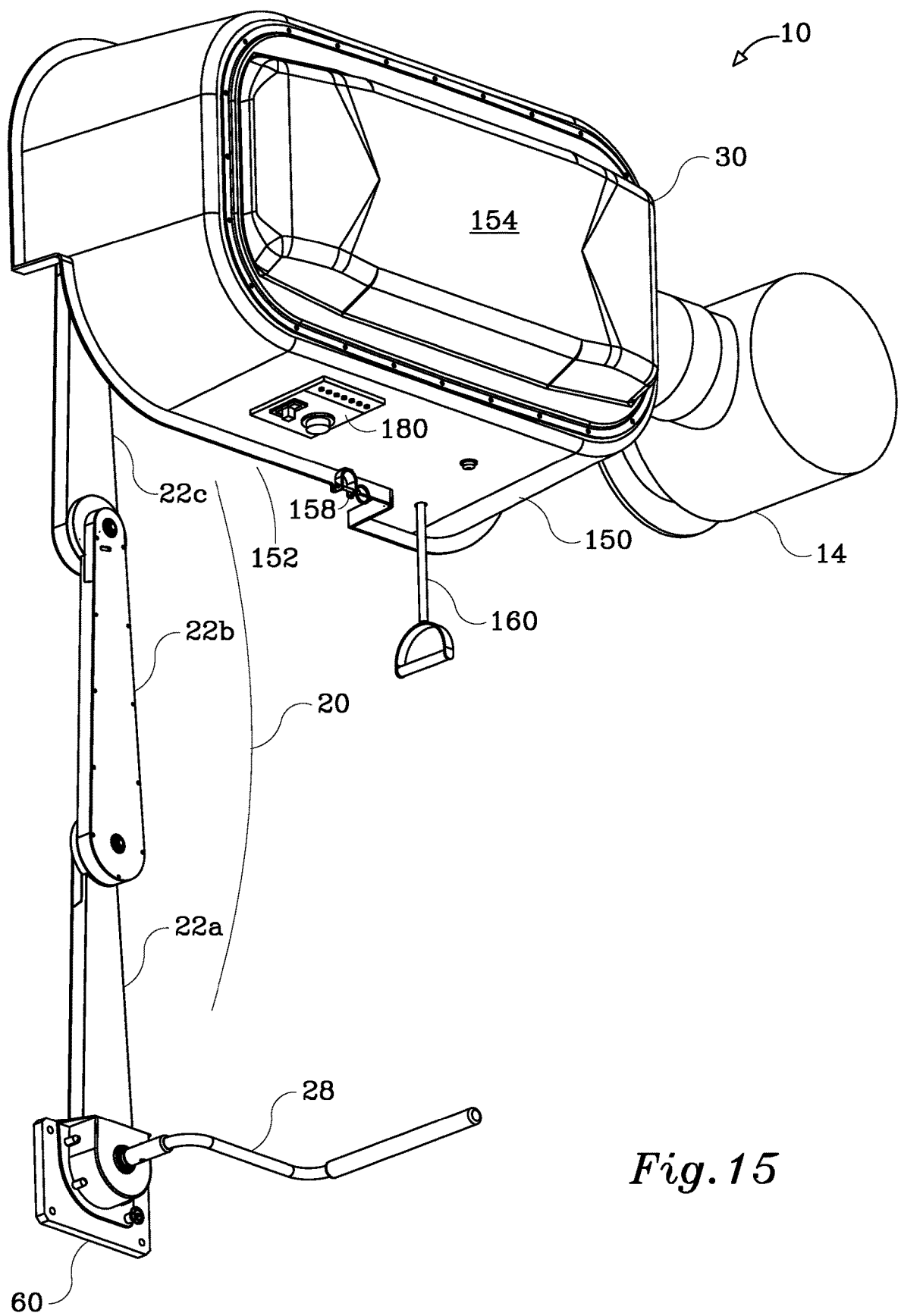
FIG. 15 is a perspective view of the NBC filtration system, made according to a different embodiment of the present invention.
Figure 16:
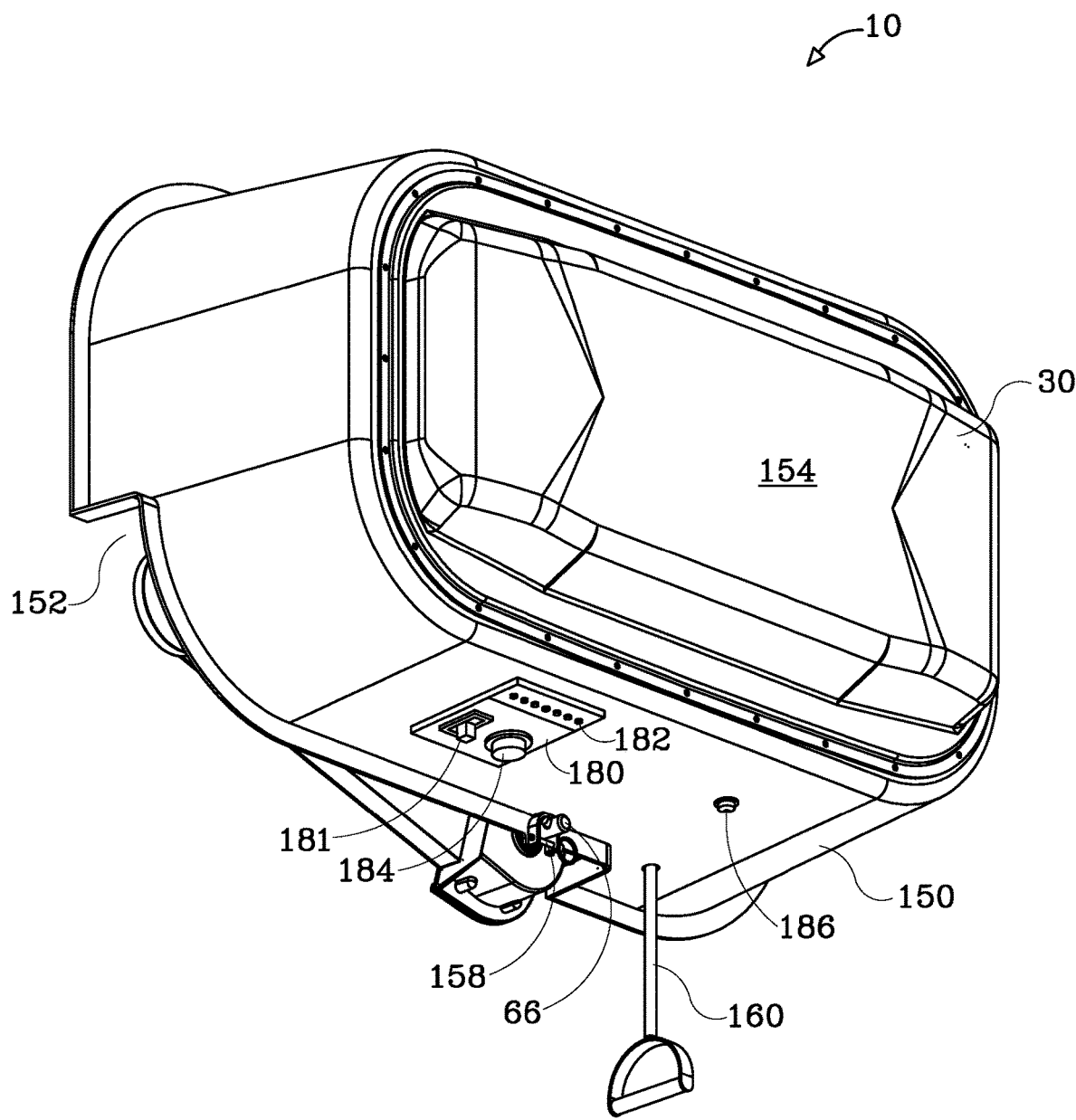
FIG. 16 is a perspective view of the NBC filtration system of FIG. 15, demonstrating the air exchange backup unit fully folded.

With reference to FIGS. 15 to 18, there is shown another embodiment of the invention where a peripheral cover 150 serving also as a mounting frame, affixes the filter unit 30 to the wall of the protection shelter. The peripheral cover 150 encapsulates the blower 40, the changeover valve 50 and the air exchange backup unit 20 when folded up as shown in FIG. 16. It will be appreciated that when the air exchange backup unit 20 is folded up, the various elements of the filtration system are not visible to the occupants of the protection shelter, being hidden behind the filter unit 30 and the peripheral cover 150.

The visible front face 154 of the filter unit 30 and the peripheral cover 150 features a neat aesthetic appearance, such that the protection shelter can be used for any other purpose during normal times. It will be also appreciated that the filtration system as disclosed by the various embodiments is ready for immediate use at all times with minimal effort as will be explained herein-below.

Figure 9:
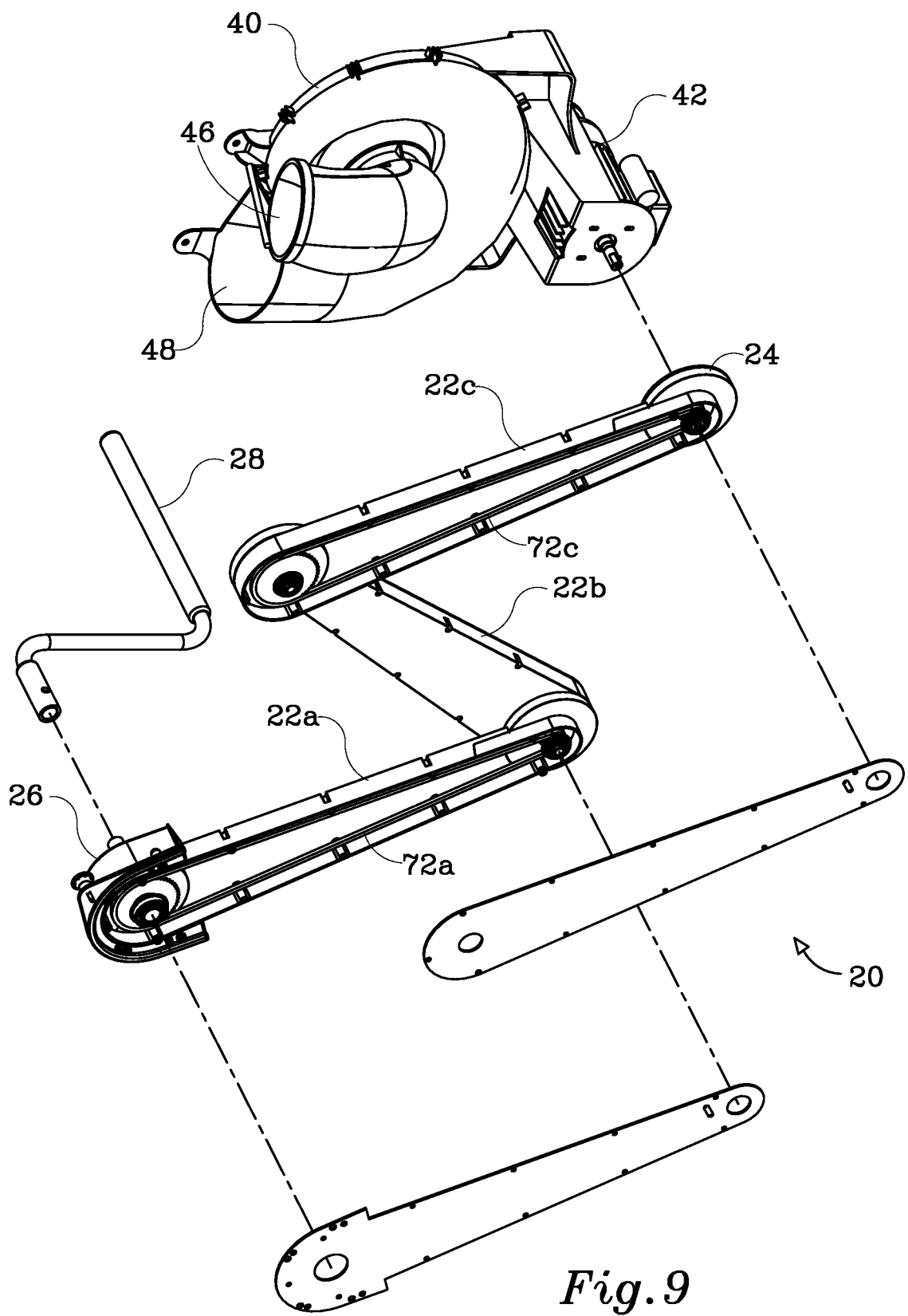
FIG. 9 is an enlarged exploded perspective view of the air exchange backup unit.
Figure 10:
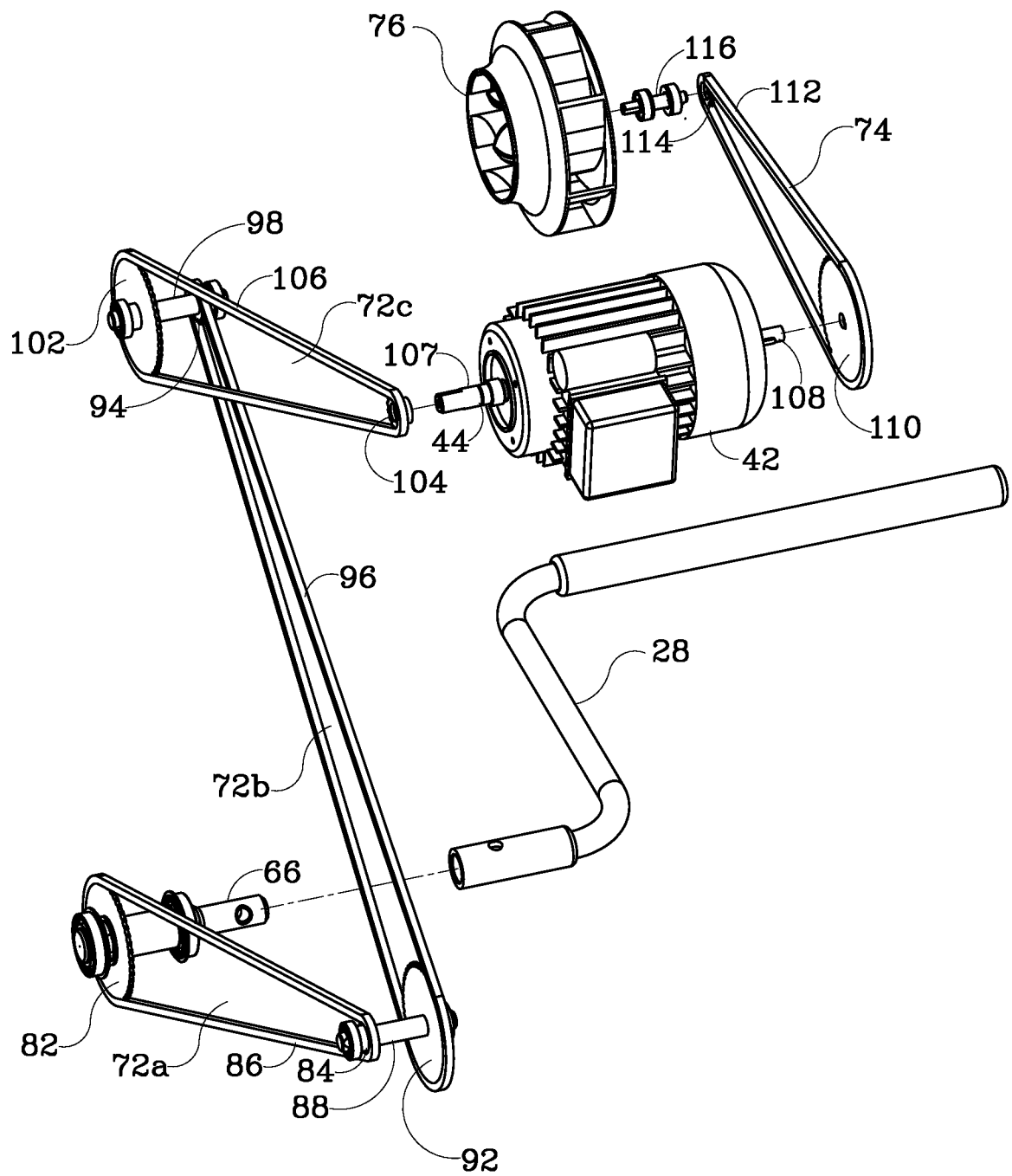
FIG. 10 is a perspective skeleton view demonstrating the electrical and manual drive systems of the air exchange backup unit.

As mentioned above, the manual air exchange backup unit is designed for manual operation of the blower in an event of power failure. According to an embodiment of the invention, the manual air exchange backup unit is constructed as a foldable arm. With reference to FIGS. 8 to 10, the foldable arm comprises a plurality of hinged segments 22(a, b and c), serially linked to each other. The hinged segments 22(a, b, and c) are configured for transmission of rotational motion between each other. At least one of the hinged segments 22(a, b or c) comprises at least one stage of a first speed increasing transmission. A first end 24 of the manual air exchange backup unit 20 is swiveably attached to the electric motor 42. A second end 26 of the manual air exchange backup unit 20 carries a detachable hand crank 28. Rotation of the hand crank 28 at normal manual operation of about 40 rpm, rotates the electric motor 42 at substantially a rated speed of the electric motor. The rotational motion is transmitted from the uppermost hinged segment 22c, to a shaft 44 of the electric motor 42, typically through an unidirectional freewheel. The second end 26 of the foldable arm is firmly attachable by a dedicated bracket 60 to a wall of the protection shelter at a convenient position for manual cranking of the hand crank. The manual air exchange backup unit 20 may selectively be folded up at normal times.

Figure 3:
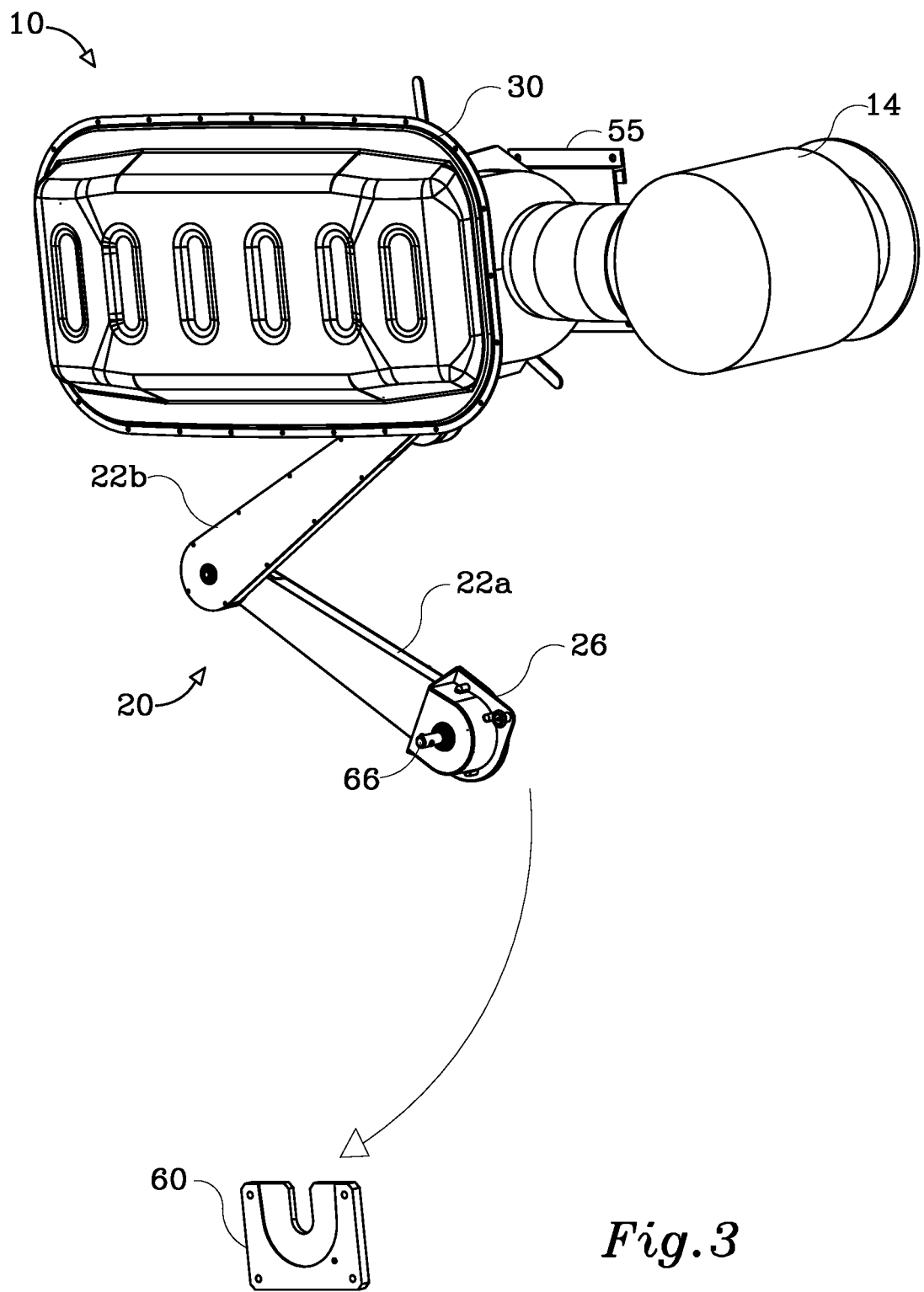
FIG. 3 is a perspective view of the NBC filtration system of FIG. 1, demonstrating a foldable air exchange backup unit halfway folded.
Figure 4:
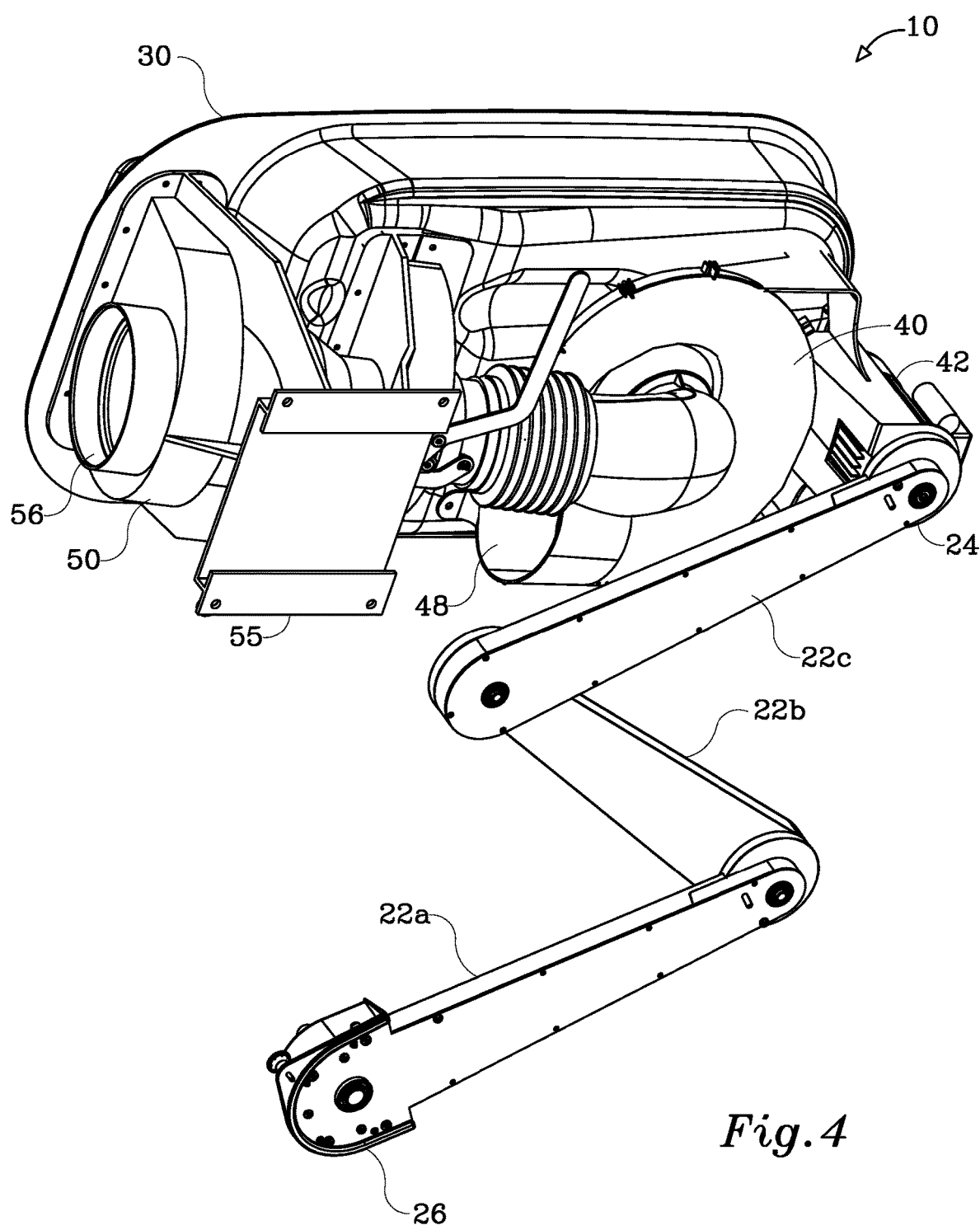
FIG. 4 is a perspective rear view of the NBC filtration system shown in FIG. 3.
Figure 5:
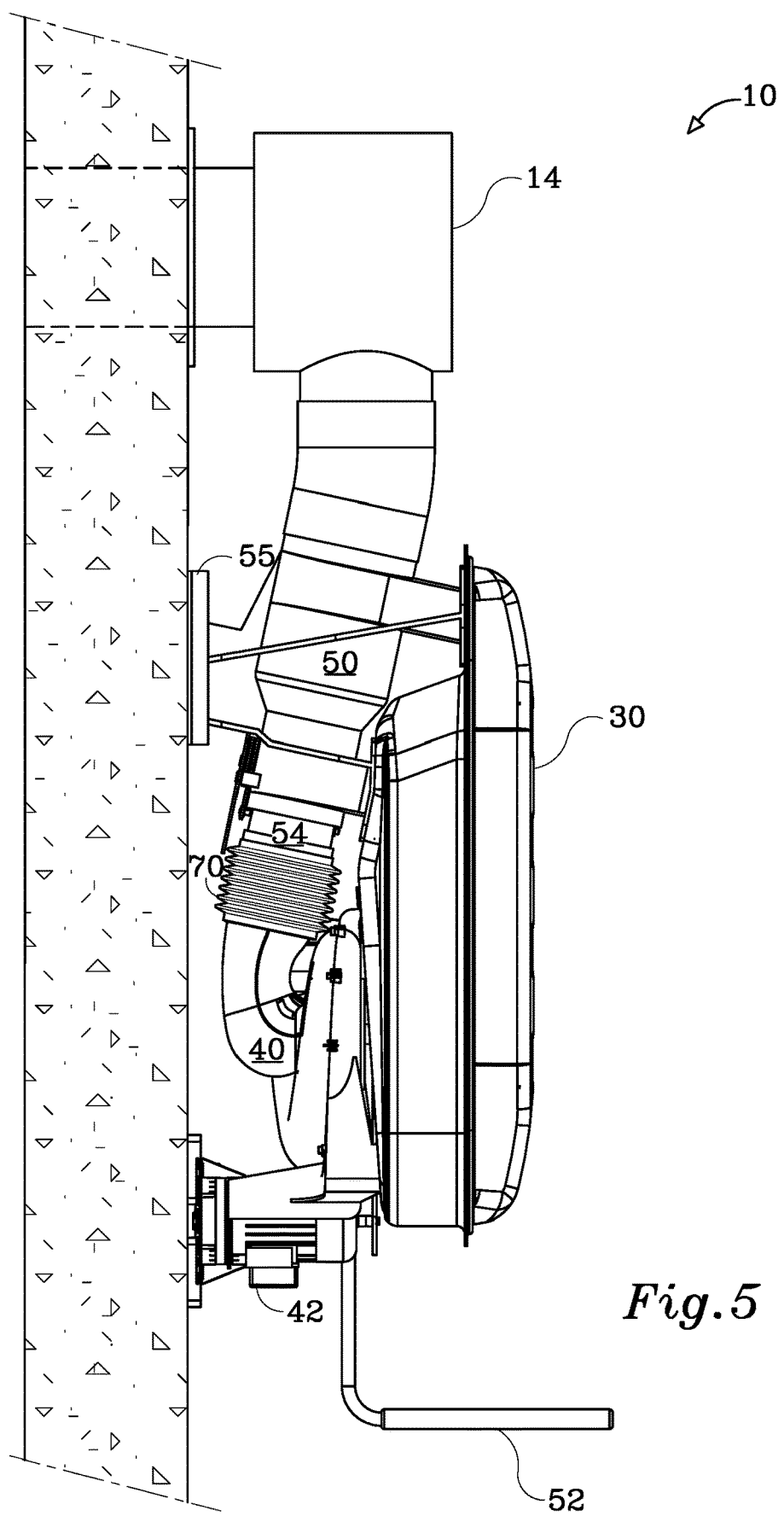
FIG. 5 is a top view of the NBC filtration system shown in FIG. 1.

With reference to FIGS. 3 and 4, the manual air exchange backup unit 20 is shown in a partially folded state, in which the hinged segments 22 are folded about the hinges to form a Z letter shape. As demonstrated in FIG. 17, the segments may be further folded to a point where the lower segment 22a is near contact with the upper segment 22c such that the manual air exchange backup unit 20 is hidden behind the filter unit 30 and practically turns invisible to the occupants of the protection shelter. As shown in FIG. 2 the NBC filtration system 10 as a whole is fitted to a wall of the protection shelter near the ceiling. Accordingly, during normal times, when the manual air exchange backup unit 20 is folded up, the NBC filtration system 10 does not interfere with regular activity taking place in the protected space.

With reference to FIGS. 4, 9 and 10, according to the shown embodiment, each of the hinged segments 22(a, b and c) includes one stage of the first speed increasing transmission of the manual air exchange backup unit 20. In FIG. 10, the manual air exchange backup unit 20 is shown with the structural elements removed, exposing the transmission elements. The first speed increasing transmission is configured as a roller chain drive including 3 stages 72(a, b and c). Obviously any other number of hinged segments and transmission stages may be used, however for reason of efficiency, the optimal number is the minimum number that delivers the desired speed increasing ratio. The pitch size of the roller chain drive is selected between 6 mm and 8 mm. It will be understood that the different stages of the first speed increasing transmission may accept different pitch size due to the different moment and rotational speed related to each of the stages.

In more detail, with reference to FIG. 10, during manual operation of the detachable hand crank 28 in an event of power failure, a first sprocket 82 fitted to an input shaft 66 is directly rotated by the hand crank 28. The first sprocket 82 rotates a second sprocket 84 smaller than the first sprocket 82, via a first drive chain 86. The first sprocket 82, first drive chain 86 and second sprocket 84 are forming together the first stage 72a of the first speed increasing transmission of air exchange backup unit 20. As shown in FIG. 10, the second sprocket 84 is mounted on one end of a first intermediate shaft 88 defining also a hinge axis between the first segment 22a and the second segment 22b of the foldable arm constituting the air exchange backup unit 20. A third sprocket 92 is mounted on the other end of the first intermediate shaft 88, thus accepting the same rotational speed as the second sprocket 84.

The third sprocket 92 rotates a forth sprocket 94 smaller than the third sprocket 92, via a second drive chain 96. The third sprocket 92, second drive chain 96 and fourth sprocket 94 are forming together the second stage 72b of the first speed increasing transmission of air exchange backup unit 20. The fourth sprocket 94 is mounted on one end of a second intermediate shaft 98 defining also a hinge axis between the second segment 22b and the third segment 22c of the foldable arm constituting the air exchange backup unit 20. A fifth sprocket 102 is mounted on the other end of the second intermediate shaft 98, thus accepting the same rotational speed as the fourth sprocket 94.

The fifth sprocket 102 rotates a last sprocket 104 smaller than the fifth sprocket 102, via a third drive chain 106. The fifth sprocket 102, third drive chain 106 and last sprocket 104 are forming together the third stage 72c of the first speed increasing transmission of air exchange backup unit 20.

The last sprocket 104 is linked to a first end 107 of the motor shaft 44 through an unidirectional freewheel also known as freewheel clutch or freewheel bearing. The unidirectional freewheel permits rotation of the motor shaft 44 by the manual air exchange backup unit 20, but prevents rotation of the first speed increasing transmission elements by freewheeling when the motor is electrically energized. It will be understood that different types of unidirectional or clutch mechanisms can be used alternately, for instance a ratchet mechanism or a wound spring mechanism as known in the art.

With reference to FIGS. 5 to 8, the filter unit 30 comprises a particulate filter 32 and a gas adsorption filter 34. The inlet port 36 and outlet port 38 are airflow coupled to the changeover valve 50 demonstrating ventilation mode in FIG. 6 and NBC filtration mode in FIG. 7, as will be further explained herein-below. According to an optional embodiment, the filter unit 30 is elongated is shape, horizontally positioned along a top portion of a wall of the protection shelter. The inlet port 36 and the outlet port 38 of the filter unit are located in proximity to each other near a first extremity of the filter unit. Optionally the inlet port and the outlet port of the filter unit are facing the wall of the protection shelter.

With reference to FIGS. 15 to 18, according to an embodiment, a peripheral cover 150 serving also as a mounting frame, affixes the filter unit 30 to the wall of the protection shelter. The blower 40, changeover valve 50 and air exchange backup unit 20, are all affixed directly to the inner face 156 (FIG. 17) of the filter unit 30. Such that removal of the entire filtration system 10 for purpose of replacement or maintenance may be performed either by detaching the peripheral cover 150 including filter unit 30 from the wall of the protection shelter, or by detaching the filter unit 30 from the peripheral cover 150, without detaching the peripheral cover 150 from the wall of the protection shelter.

The peripheral cover 150 comprises an opening 152 at a bottom face thereof. The opening 152 permits expansion of the air exchange backup unit 20 while keeping the peripheral cover 150 in place. It will be understood that a removable, hinged, sliding or otherwise open-able cover (not shown) may be fitted to the opening 152 during normal times for aesthetic reasons.

Optionally in order to lock the foldable air exchange backup unit 20 in the folded up position during normal times, there is provided a recess at the bottom face of peripheral cover 150 and a securing pin 158. Such that the shaft 66 extending from the second end 26 of the air exchange backup unit 20 may be locked in the recess, securing the air exchange backup unit 20 in the folded up position. Upon an event of electric power failure, the securing pin 158 is removed and the air exchange backup unit 20 is extended to the manual operation position.

According to an embodiment, the peripheral cover 150 may be a partial cover provided to the bottom of the filtration system 10. Such partial cover provides an aesthetic appearance while reducing material and manufacturing cost.

Yet with reference to FIGS. 15 and 16, a user panel 180 is provided, at the bottom face of the peripheral cover 150 by a way of example. The user panel 180 comprises an electric switch 181 wired to turn on and off the motor 42 of blower 40, a speed adjustment knob 184 configured for tuning of the motor 42 speed, and a status indicator interface 182. An optional light source 186 is provided for illumination purposes in an event of power failure.

The status indicator interface 182 provides a visible or otherwise perceptible reading of the flow-rate of fresh air entering into the protection shelter. The status indicator may be of the mechanical vane type as known in the art, or of an electronic type as described in Israeli patent application 257934 to the present applicant. The measured airflow is generated by the blower 40 whether operated electrically as preferred or manually as a result of electric power failure and use of the air exchange backup unit 20. An electronic status indicator interface 182 may use a liquid crystal display (LCD) or a series of light emitting diodes (LEDs) as depicted, providing visual indication of the rate of airflow. When series of LEDs are used, by way of example, the rate of airflow is interpreted by the number or position of lighting LEDs.

It should be noted that the electric motor 42 is typically oversizes to compensate for a partially clogged filter unit 30. However, excessive amount of air flow shortens the operation time of the adsorption filter and hence is undesired. In order to avoid such situation during normal electric operation, there is a need to periodically adjust the airflow-rate. During normal electric operation, the operator may adjust the blower speed electrically, using the adjustment knob 184. In an event of power failure, the operator may increase or reduce the speed of rotation of the hand crank 28 to obtain the desired airflow-rate as indicated on the status indicator interface 182, thus extending the operation time of the adsorption filter and saving physical effort to allow longer manual operation of the hand crank.

With reference to FIGS. 6, 8, 9 and 10, a suction port 46 of the blower 40 is airflow coupled to the changeover valve 50 trough an expandable duct 70. The blowout port 48 of blower 40, is open to the space of the protection shelter such that filtered air is spread into the space without restriction. The blower 40 is driven by an electric motor 42 either directly or through a second speed increasing transmission 74 as shown in FIG. 10. For economic and long term reliability reasons a standard 4-pole induction motor may be preferred. The second speed increasing transmission, if applicable, comprises a first sprocket 110 fixed to a second end 108 of the motor shaft 44, a drive chain 112, and a second sprocket 114, smaller than the first sprocket 110. The second sprocket 114 of the second speed increasing transmission 74 is fitted to a first end of a blower shaft 116. The second end of the blower shaft 116 carries an impeller 76 of the blower 40.

The second speed increasing transmission 74 driving the blower is capable of driving an impeller 76 of the blower at a rotational speed of above 3000 rpm using a 4-pole induction motor. To minimize transmission losses, the second speed increasing transmission 74 may be configured as a toothed belt drive, a roller chain drive or an inverted tooth chain drive also known as silent chain. Due to the high speed and low torque of this second speed increasing transmission, if a roller chain drive or a silent chain drive is utilized, than the pitch size is selected between 3 mm and 6 mm. It will be understood that other transmission types can be used such as direct gear drive, single V belt drive, multi-groove belt drive also known as V-Ribbed or polygroove, flat belt drive and ladder chain drive. The blower 40 is positioned along the filter unit 30 near a second extremity thereof distal from the inlet and outlet ports 36, 38 respectively. Optionally, the blower 40 may be positioned between the filter unit 30 and the wall of the protection shelter.

With reference to FIGS. 6, 7, 8, 13 and 14, the above mentioned changeover valve 50 is configured for changing the NBC filtration system state between a ventilation mode, effective during normal times or conventional hazard, and an NBC protection mode, effective during NBC hazard.

According to an embodiment, the changeover valve 50 comprises a tubular housing 52 and an internal axially displaceable tubular valve member 54. The tubular housing 52 is extending along the filter unit 30 near the first extremity thereof where the inlet port 36 and outlet port 38 are positioned. A first end of the tubular housing 52 distal from the blower 40 serves as a primary inlet 56 of the changeover valve. The primary inlet 56 is airflow coupled to the prefilter 14. A first end of the axially displaceable tubular valve member proximal to the blower 40 serves as a primary outlet 57 of the changeover valve. The primary outlet 57 is airflow coupled to the suction port 46 of the blower 40 through an expandable duct 70. A first transversal duct extending from the tubular housing 52, which is airflow coupled to the inlet port 36 of the filter unit 30, serves as a secondary outlet 58 of the changeover valve. And a second transversal duct extending from the tubular housing 52, which is airflow coupled to the outlet port 38 of the filter unit 30, serves as a secondary inlet 59 of the changeover valve.

Figure 7:
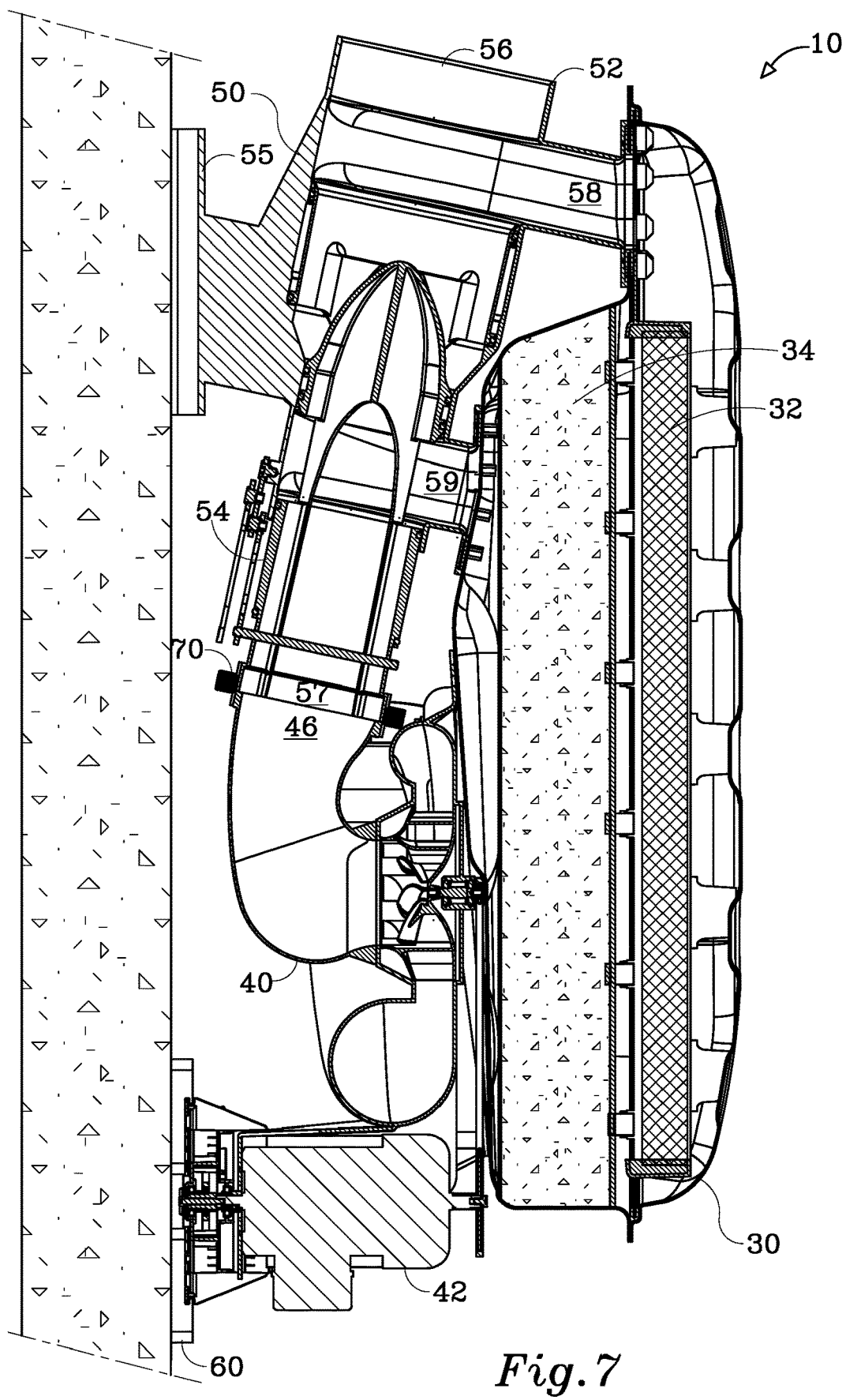
FIG. 7 is a sectional view as shown in FIG. 6, demonstrating different operational state.
Figure 13:
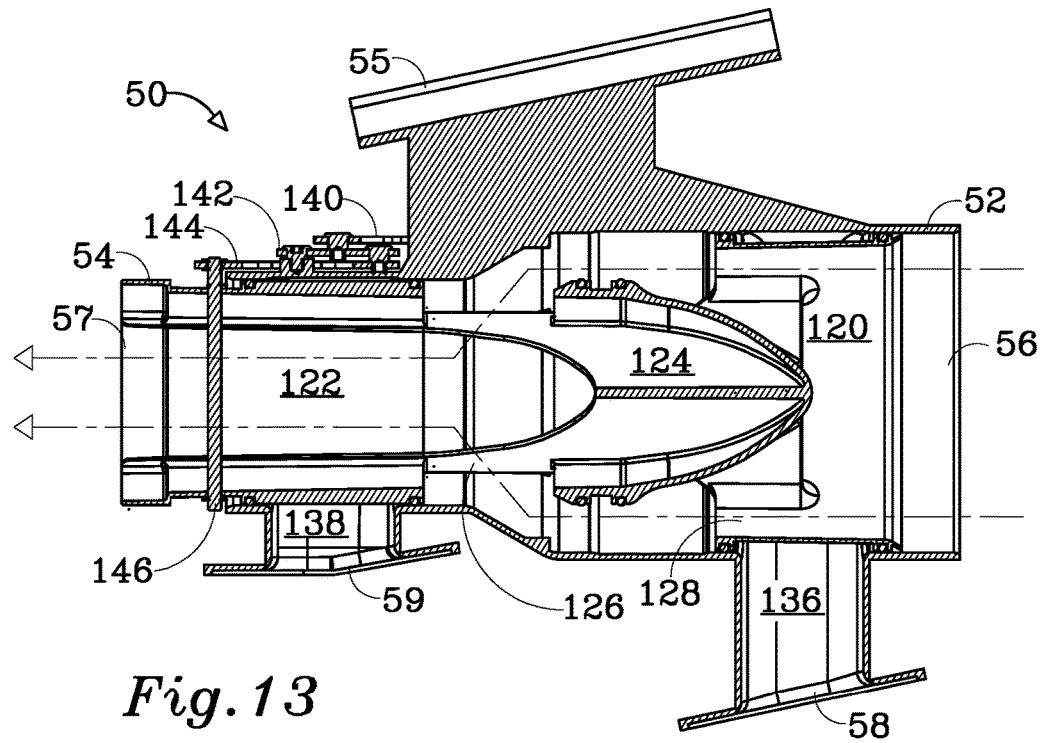
FIGS. 13 and 14 are sectional views of the changeover valve demonstrating the different operation states.
Figure 14:
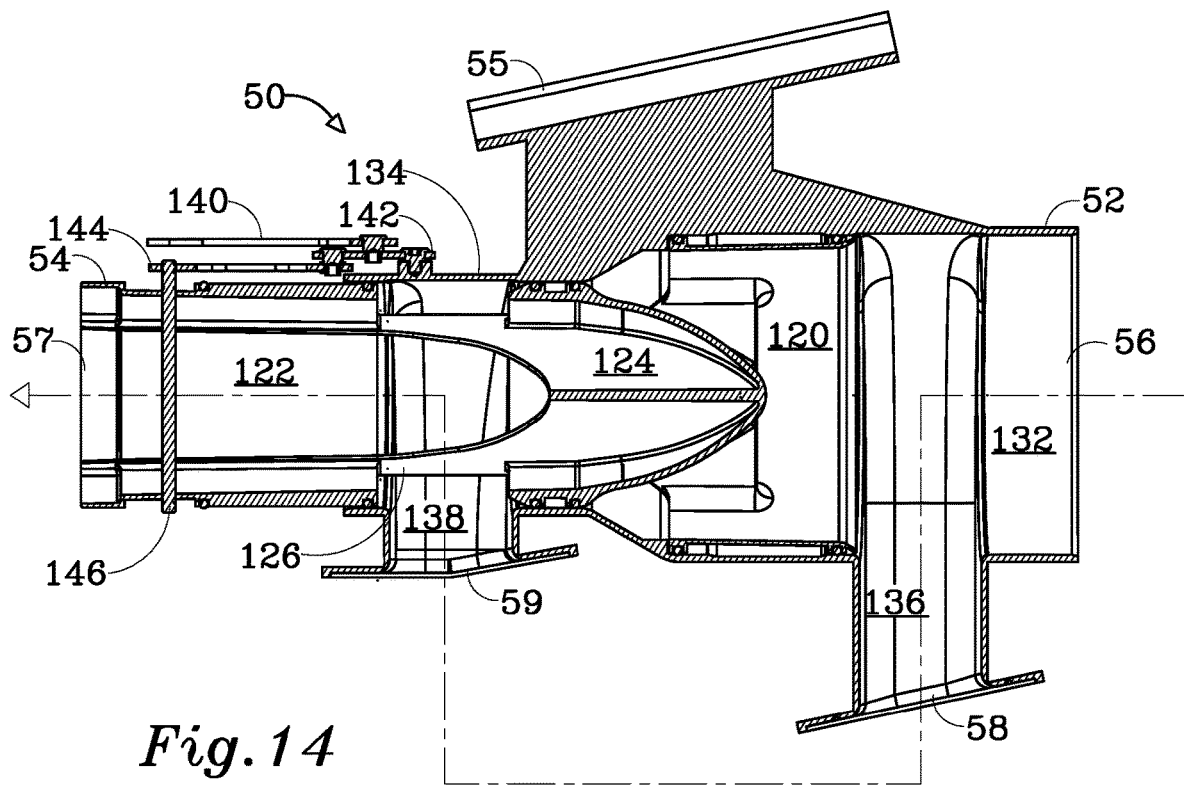

As mentioned above, the primary outlet 57 of the changeover valve 50 is airflow coupled to the suction port 46 of the blower 40 by an expandable duct 70 permitting axial displacement of the tubular valve member 54 while preserving airtight coupling. Axial displacement of the tubular valve member 54 towards the first end of the tubular housing distal from the blower 40, as shown in FIGS. 6 and 13, air flow couples the primary inlet 56 with the primary outlet 57, thus bypassing the filter unit 30. And axial displacement of the tubular valve member 54 away from the first end of the tubular housing, as shown in FIGS. 7 and 14, air flow couples the primary inlet 56 with the secondary outlet 58, and air flow couples the primary outlet 57 with the secondary inlet 59, while blocking the direct passage from the primary inlet 56 to the primary outlet 57, thus directing airflow through the filter unit 30.

Figure 11:
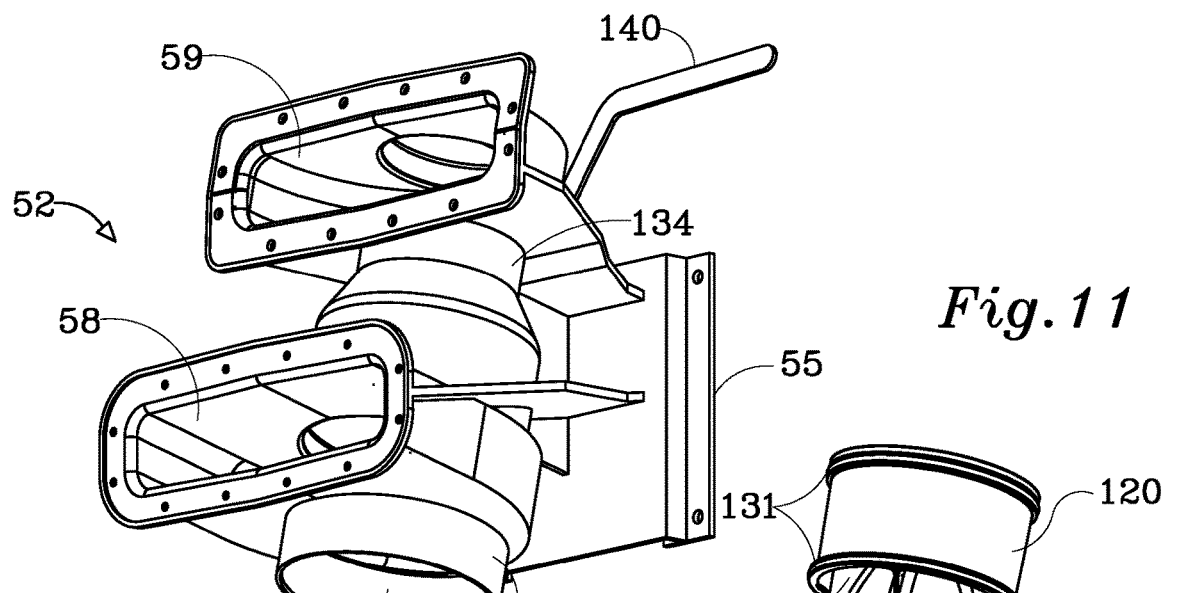
FIGS. 11 and 12 are exploded perspective views of a changeover valve made according to an embodiment of the invention.
Figure 12:
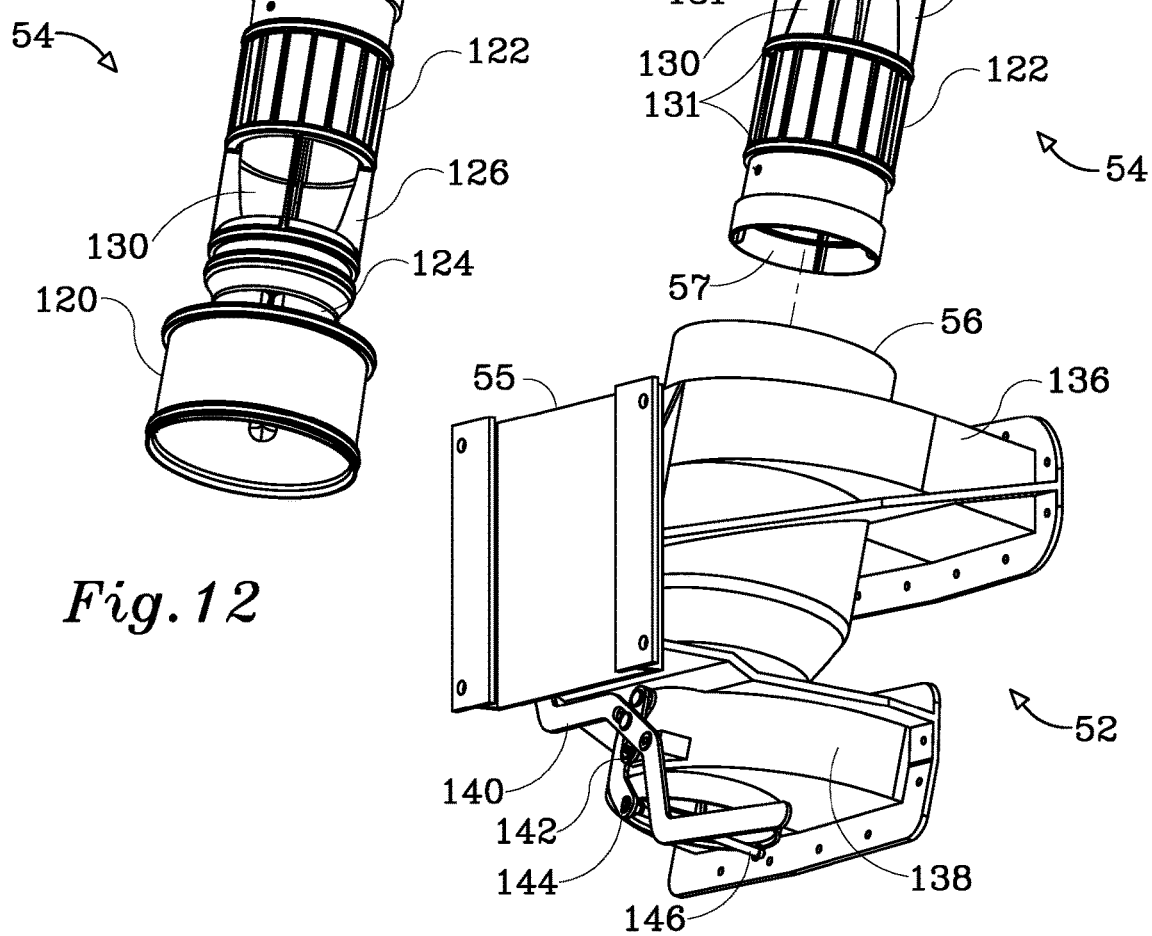

In more detail FIGS. 11 and 12 depicts two exploded perspective views of the changeover valve, shown from different directions. The tubular valve member generally referenced 54 is extracted from position in the tubular housing generally referenced 52 by pulling it out along its axis through the primary inlet 56. The tubular valve member 54 comprises a first tubular portion 120, a second tubular portion 122 smaller in diameter than the first tubular portion 120, and an aerodynamically shaped elliptical cone portion 124 positioned there between. The elliptical cone portion 124 receives a base diameter substantially similar to that of the second tubular portion 122. The elliptical cone portion 124 is pointing towards and partially encased in the first tubular portion 120. All three elements, namely the first tubular portion 120, the second tubular portion 122, and the elliptical cone portion 124 are sharing a common longitudinal axis. The three elements are joined to a single unit by plurality of radially arranged longitudinal fins 126. Airflow is possible through a peripheral gap 128 located between the first tubular portion 120 and the elliptical cone portion 124, and through a cylindrical gap 130 located between the second tubular portion 122 and the elliptical cone portion 124.

Annular elastomer seals 131 are provided to the tubular valve member 54. A pair of seals 131 are provided to both ends of the first tubular portion 120, another pair of seals 131 are provided to both ends of the second tubular portion 122, and a third pair of seals are provided to the base of the elliptical cone portion 124.

The tubular housing 52 is configured as a stepped diameter cylinder where the larger diameter portion 132 accepts the first tubular portion 120 of the tubular valve member 54, and the smaller diameter portion 134 accepts the second tubular portion 122 of the tubular valve member 54. The first transversal duct 136 is extending from the larger diameter portion 132 of the tubular housing 52. And the second transversal duct 138 is extending from the smaller diameter portion 134 of the tubular housing 52.

According to an embodiment, an optional mounting bracket 55 is provided to the tubular housing 52 to facilitate attachment of the NBC filtration system 10 to the wall of the protection shelter. An additional mounting bracket (not shown) may be fitted to the blower 40 as well, depending on the length of the filter unit 30 and the total weight of the NBC filtration system 10. A complementary wall bracket may be fixed to the wall of the protection shelter, such that the entire NBC filtration system is hanged on the complementary wall bracket at ease and without additional preparations.

In operation and with reference to FIGS. 13 and 14, there are shown sectional views of the changeover valve generally referenced 50, in a ventilation mode (FIG. 13) and in NBC filtration mode (FIG. 14), as briefly explained above with reference to FIGS. 6 and 7.

According to the embodiment, in ventilation mode as shown in FIG. 13, the first tubular portion 120 of the tubular valve member 54 blocks the exit into the first transversal duct 136. And the second tubular portion 122 of the tubular valve member 54 blocks the exit into the second transversal duct 138. As a result the air entering the primary inlet 56 of the changeover valve 50, flows through the peripheral gap 128 and around the elliptical cone portion 124 of the tubular valve member 54. The air than flows through the cylindrical gap 130 located between the second tubular portion 122 and the elliptical cone portion 124. And through the second tubular portion 122 of the tubular valve member 54 to the primary outlet 57 of the changeover valve 50. The airflow pattern is demonstrated by arrowed center lines. It will be noted that the aerodynamically shaped elliptical cone portion 124 provides smooth flow pattern with minimal losses. This flow pattern is essential in particular to save human energy during electric power failure where the blower is manually operated.

In NBC filtration mode as shown in FIG. 14, the tubular valve member 54 is axially moved away from the primary inlet 56 such that the elliptical cone portion 124 is blocking the axial passage from the primary inlet 56 to the primary outlet 57. The first tubular portion 120 of the tubular valve member 54 clears the exit into the first transversal duct 136 and air can flow from the primary inlet 56 to the secondary outlet 58. On the other side, the second tubular portion 122 of the tubular valve member 54 clears the exit into the second transversal duct 138 and air can flow from the secondary inlet 59 to the primary outlet 57. The airflow pattern is demonstrated by an arrowed center line, where the line portion external to the changeover valve 50 demonstrates air passage through the filter unit 30.

A state selection lever 140 is pivotally fitted on top of the tubular housing 52 opposite the secondary inlet 59. The state selection lever 140 is provided with a first and a second link elements 142, 144 respectively, and pivot 146, arranged to translate angular displacement of the selection lever 140 into linear displacement of the tubular valve member 54. The pivot 146 is passing through apertures made to the tubular valve member 54 near the primary outlet 57. Movement of the pivot 146 by the first and second link elements 142, 144 displaces the tubular valve member 54 to one of the operation states as described above.

Figure 17:
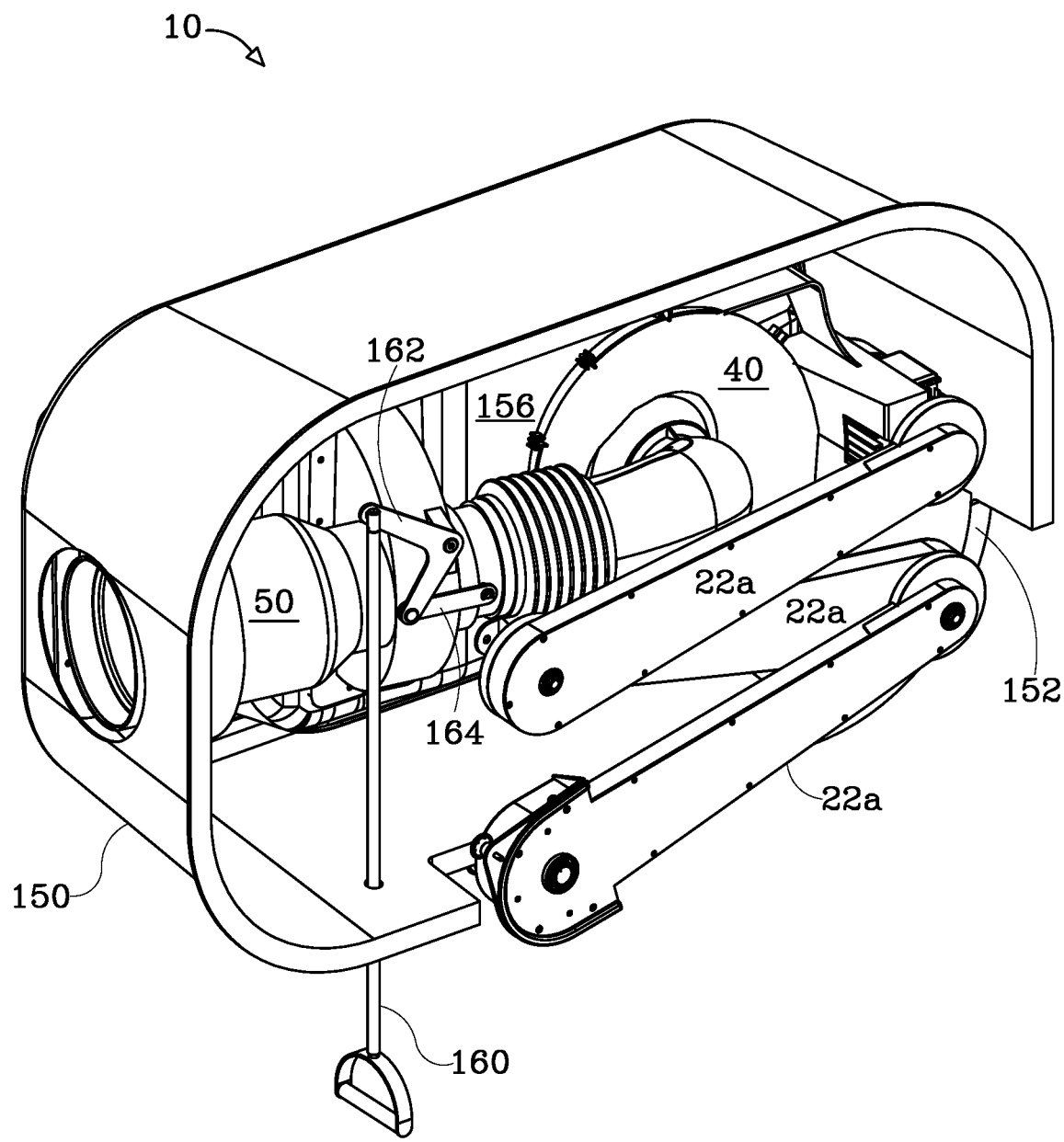
FIG. 17 is a perspective rear view of the NBC filtration system of FIG. 16.
Figure 18:
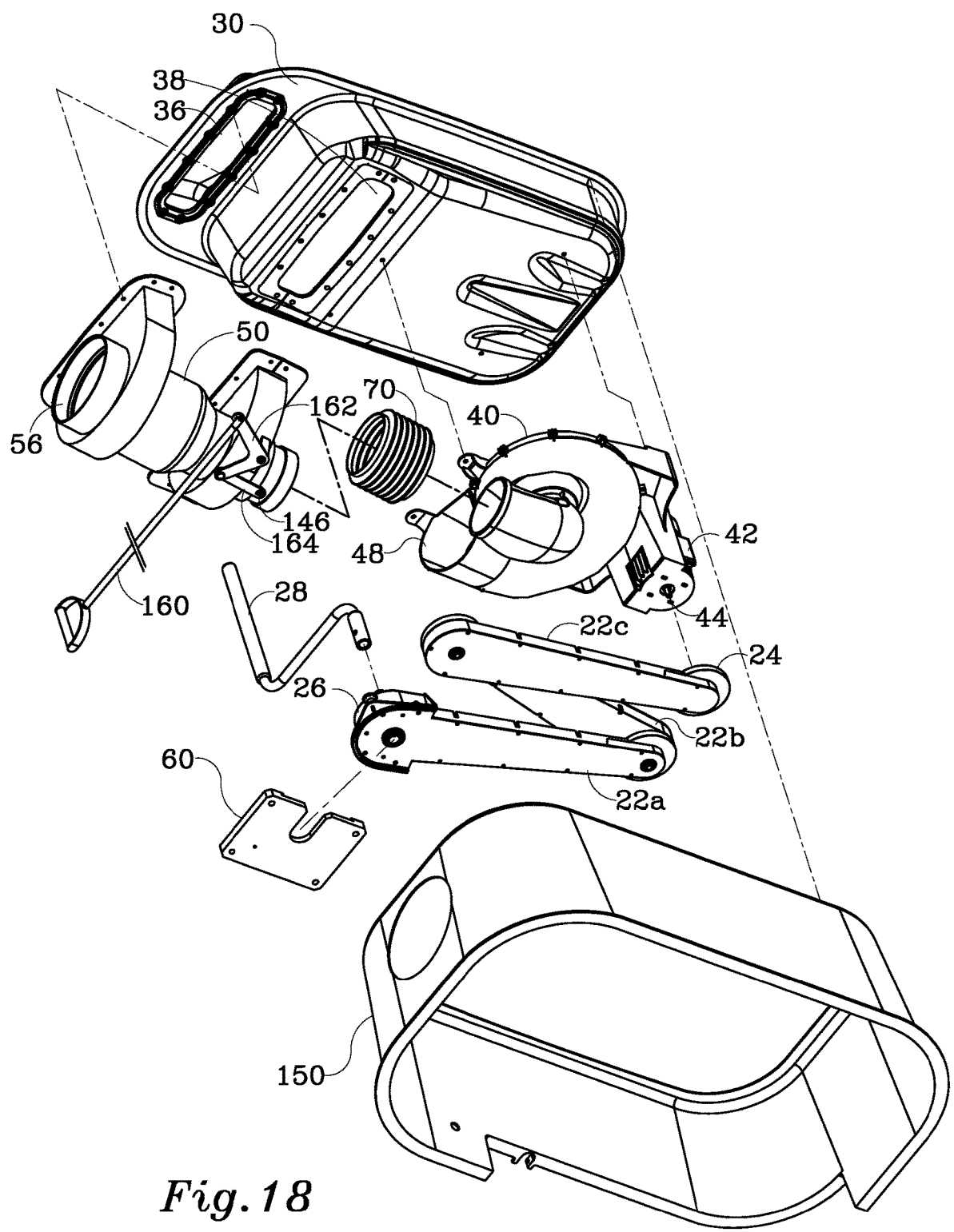
FIG. 18 is an exploded perspective view of the NBC filtration system shown in FIG. 17.

With reference to FIGS. 17 and 18, according to an alternative embodiment, a different state selector mechanism is provided. The state selector mechanism comprises a push-pull handle 160, linked to a first arm of a direction changing mechanism such as bell-crank 162, and a link 164 fitted at one end to the second arm of the bell-crank 162 and fitted at the other end to the pivot 146, passing through the tubular valve member 54 as described above with reference to the first embodiment.

The handle 160 is extending downwards below the peripheral cover 150 and is easy to grip and pull at declaration of NBC hazard, in order to switch the mode of operation to filtration mode. Pushing the handle 160 up reverts the filtration system back to ventilation mode.

As mentioned above, the NBC filtration system of FIG. 1 is fitted in a first orientation while the NBC filtration system of FIG. 2 is fitted in an inverted orientation. For ease of understanding, the orientation depicted in FIG. 1 will be called a right hand installation and the orientation depicted in FIG. 2 will be called a left hand installation. With reference to FIGS. 4, 8 and 9 it will be understood that the manual air exchange backup unit 20 may be rotated to any direction being swiveably attached to the electric motor 42 as mentioned above. The third segment 22c of the manual air exchange backup unit 20, may optionally be attached to the frame of the electric motor 42 through a swiveable joint. Accordingly, the entire NBC filtration system may be inverted while the air exchange backup unit 20 keeping the desired downward direction. The right hand installation and left hand installation options are required to advertise different locations of the air intake in relation to the edges of the protection shelter. Obviously such different locations of the air intake are common due to different architectural design of the building. It will be understood from the above explanation, that the NBC filtration system may accept any orientation thus adopting to any position of air intake, even irregular or wrong positions.

The described embodiments and possible other embodiments of the invention provides high integration of the four main elements of the NBC filtration system while implementing modular construction of standard building blocks. Accordingly, each of the four main elements composing the NBC filtration system may be replaced by an element of the same functionality having a different capacity, without effecting the other elements. For example, A longer or shorter filter unit 30 may be used for different occupant capacities or different protection time period while using the standard other components. Optionally only the blower 40 may be replaced with a blower of a different flow rate or different pressure more suitable for the application. The changeover valve and the air exchange backup unit may effectively be used for several capacities of NBC filtration systems. As a result filtration systems of different airflow capacities can be easily assembled and production simplified.

The present invention seeks protection regarding the device as described above, as well as the method steps taken to accomplish the desired result of ventilating the protection shelter during normal times or conventional hazard. As well as purifying the entering air in an event of NBC contamination. Both operations being viable even during electric power failure. The method steps demonstrate the ease of operation and readiness of the NBC filtration system for immediate use.

Figure 19:
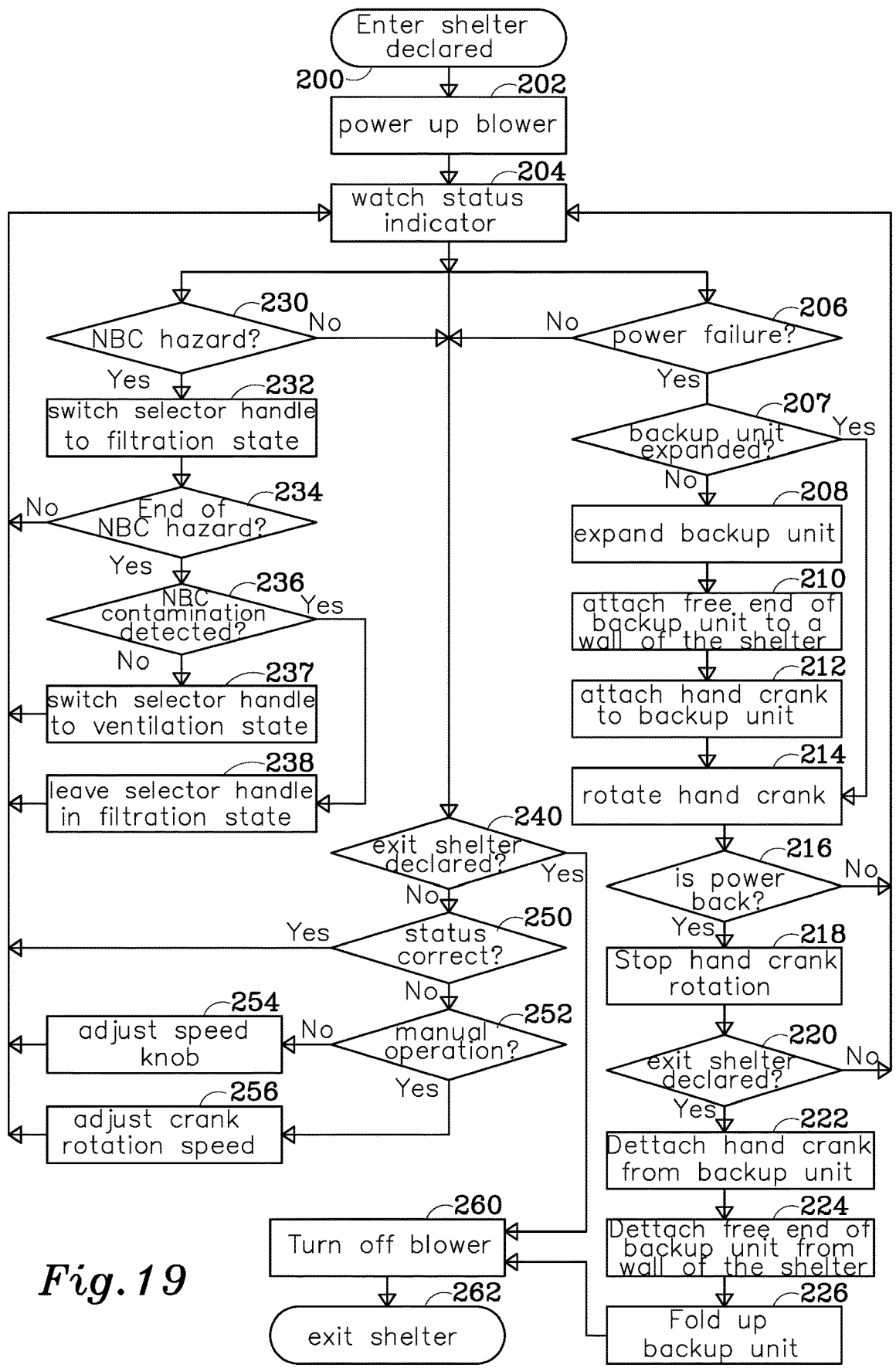
FIG. 19 is a flow chart demonstrating method steps taken to operate the filtration system of embodiments of the present invention.

Accordingly and with reference to FIG. 19, a method of operation of a modular, near ceiling mounted, NBC filtration system for protection shelters is provided, comprising one or more of the steps below:

a. providing a near ceiling mounted NBC filtration system comprising: a filter unit 30 positioned along a top portion of a wall of the protection shelter; a blower 40 driven by an electric motor 42, the blower is positioned along the filter unit 30; an air exchange backup unit 20 comprising a plurality of hinged segments 22(*a, b, c*) serially linked to each other, forming a foldable arm, a first end 24 of the air exchange backup unit is swiveably attached to the electric motor 42 and a second end 26 of the air exchange backup unit 20 carries a detachable hand crank 28; a status indicator interface 182 configured to exhibit an airflow-rate of the blower 40; an adjustment knob 184 configured for tuning the speed of the motor 42; and a changeover valve 50, selectively airflow coupling the filter unit 30 and the blower 40, the changeover valve comprising a state selector handle 140, 160 for switching the changeover valve 50 between ventilation and filtration states.

b. Using an electric switch 181 to power on the electric motor 42 driving the blower 40 in any event requiring entrance into the protection shelter. Indicated as start 200 and activity 202 of the flowchart in FIG. 19.

c. Observing the status indicator interface 182 and adjusting the adjustment knob 184 if required. Indicated as activity 204, decisions 250, 252 and activity 254 of the flowchart.

d. Using the switch 181 to power off the electric motor 42 driving blower 40, and leaving the protection shelter when back to normal or exit shelter is declared. Indicated as decisions 240 activity 260 and end 262.

The method may further comprise between steps c and d, one or more of the steps of:

e. Expanding the air exchange backup unit 20 in an event of power failure, if the air exchange backup unit 20 is not already expanded. Indicated as decisions 206, 207 and activity 208.

f. Attaching the second end 26 of air exchange backup unit 20 to a wall of the protection shelter at a convenient position for manual cranking of the hand crank, typically by means of a bracket 60. Indicated as activity 210.

g. Attaching the detachable hand crank 28 to the second end 26 of air exchange backup unit 20. Indicated as activity 212.

h. Cranking the hand crank 28 while the power failure continues. Indicated as activity 214 and decision 216 of the flowchart.

i. Observing the status indicator interface 182 and adjusting the cranking speed of hand crank 28 if required. Indicated as activity 204, decisions 250, 252 and activity 256 of the flowchart.

The method may further comprise after step i, one or more of the steps of:

j. Stopping the cranking operation when electric power is revived. Indicated as activity 218 of the flowchart.

k. Detaching the detachable hand crank from the second end of the air exchange backup unit when back to normal or exit shelter is declared. Indicated as activity 222 and decision 220 of the flowchart.

l. Detaching the second end 26 of the air exchange backup unit 20 from the wall of the protection shelter. Indicated as activity 224 of the flowchart.

m. Folding up the air exchange backup unit 20. Indicated as activity 226 of the flowchart. The method may further comprise between steps c and d, one or more of the steps of:

n. Switching the state selector handle 140, 160 to filtration state in an event of NBC hazard declaration. Indicated as decision 230 and activity 232 of the flowchart of FIG. 19.

d. Switching the state selector handle 140, 160 back to ventilation state when NBC hazard declaration is canceled and only if no contamination detected. Indicated as decisions 234, 236 and activities 237, 238 of the flowchart of FIG. 19. It will be understood that if contamination occurred, the filtration system must be left in filtration state and the filter unit should be replaced by professional staff with appropriate equipment.

It will be understood that steps e, f, g, indicted by activities 208 to 214 of the flowchart are required in order to start manual operation of the air exchange backup unit. However, the following steps k, l, m, indicated by activities 220 to 226 are optional or may be carried out at a later time or by a dedicated maintenance person that may further check the system before bringing it back to readiness and to the folded state.

It will be appreciated that the specific embodiments of the present invention described above and illustrated in the accompanying drawings are set forth merely for purposes of example. Other variations, modifications, and applications of the present invention will readily occur to those skilled in the art. It is therefore clarified that all such variations are considered within the scope and spirit of the invention. Accordingly, the protection sought herein is as set forth in the claims below.

The invention claimed is:

1. A modular NBC filtration system for protection shelters comprising:
   a) a filter unit elongated in shape, horizontally positioned along a top portion of a wall of the protection shelter, said filter unit is provided with an inlet port and an outlet port located in proximity to each other at a first extremity of said filter unit;
   b) a blower driven by an electric motor, said blower is positioned along said filter unit at a second extremity thereof distal from said inlet port and outlet port;
   c) a manual air exchange backup unit comprising a plurality of hinged segments serially linked to each other, forming a foldable arm, a first end of said air exchange backup unit is swiveably attached to said electric motor and a second end of said air exchange backup unit carries a detachable hand crank, said air exchange backup unit is selectively folded up at normal times; and
   d) a changeover valve, selectively airflow coupling said filter unit and said blower, said changeover valve comprising a tubular housing extending along said filter unit at said first extremity of said filter unit, an internal longitudinally displaceable tubular valve member, and a state selector handle for displacing said tubular valve member thus switching said changeover valve between ventilation and filtration states.

2. The NBC filtration system as claimed in claim 1, wherein each of the four main elements composing the NBC filtration system may be replaced by an element of the same functionality having a different capacity, without effecting the other elements.

3. The NBC filtration system as claimed in claim 1, wherein said hinged segments are configured for transmission of rotational motion between each other.

4. The NBC filtration system as claimed in claim 3, wherein at least one of said hinged segments comprises at least one stage of a first speed increasing transmission, such that manual rotation of said hand crank rotates said electric motor at substantially a rated speed of said electric motor.

5. The NBC filtration system as claimed in claim 4, comprising three hinged segments, wherein each of said hinged segments comprises one stage of a roller chain drive of said first speed increasing transmission.

6. The NBC filtration system as claimed in claim 1, wherein said second end of said air exchange backup unit is firmly attachable to a wall of said protection shelter at a convenient position for manual cranking of said hand crank.

7. The NBC filtration system as claimed in claim 1, wherein said inlet port and said outlet port of said filter unit are facing said wall of the protection shelter such that a visible face of said filter unit has a neat aesthetic appearance.

8. The NBC filtration system as claimed in claim 7, wherein said blower, said manual air exchange backup unit and said changeover valve are located between said filter unit and said wall of the protection shelter, thus being invisible to the shelter occupants.

9. The NBC filtration system as claimed in claim 8, wherein a peripheral cover serving also as a mounting bracket affixes said filter unit to said wall of the protection shelter, said peripheral cover encapsulates said blower, said changeover valve and said manual air exchange backup unit when folded up.

10. The NBC filtration system as claimed in claim 9, wherein said peripheral cover comprises an opening at a bottom face thereof, said opening permits expansion of said air exchange backup unit while said cover is in place.

11. The NBC filtration system as claimed in claim 1, wherein said filter unit further comprises a particulate filter and a gas adsorption filter.

12. The NBC filtration system as claimed in claim 1, wherein said blower is driven by said electric motor though a second speed increasing transmission, selected from the group consisting of: gear drive, belt drive, multi groove belt drive, toothed belt drive; a roller chain drive; and an inverted tooth chain drive.

13. The NBC filtration system as claimed in claim 1, further comprising a status indicator interface configured to exhibit an airflow-rate of said blower, and an adjustment knob configured for electronically tuning the speed of said motor.

14. The NBC filtration system as claimed in claim 1, wherein a first end of said tubular housing distal from said blower serves as a primary inlet of said changeover valve, a first end of said axially displaceable tubular valve member proximal to said blower serves as a primary outlet of said changeover valve, a first transversal duct extending from said tubular housing, which is airflow coupled to said inlet port of said filter unit, serves as a secondary outlet of said changeover valve, and a second transversal duct extending from said tubular housing, which is airflow coupled to said outlet port of said filter unit, serves as a secondary inlet of said changeover valve.

15. The NBC filtration system as claimed in claim 14, wherein said primary outlet of said changeover valve is airflow coupled to an inlet of said blower by an expandable duct.

16. The NBC filtration system as claimed in claim 14, wherein axial displacement of said tubular valve member towards the first end of said tubular housing, air flow couples said primary inlet with said primary outlet, thus bypassing said filter unit.

17. The NBC filtration system as claimed in claim 14, wherein axial displacement of said tubular valve member away from the first end of said tubular housing, air flow couples said primary inlet with said secondary outlet, and air flow couples said primary outlet with said secondary inlet, thus directing airflow through said filter unit.

18. A method of operation of a modular, NBC filtration system for protection shelters, comprising the steps of:
 a. providing a mounted NBC filtration system comprising:
  a filter unit positioned along a top portion of a wall of the protection shelter;
  a blower driven by an electric motor, said blower is positioned along said filter unit;
  an air exchange backup unit comprising a plurality of hinged segments serially linked to each other, forming a foldable arm, a first end of said air exchange backup unit is swiveably attached to said electric motor and a second end of said air exchange backup unit carries a detachable hand crank;
  a status indicator interface configured to exhibit an airflow-rate of said blower; an adjustment knob configured for tuning the speed of said motor; and
  a changeover valve, selectively airflow coupling said filter unit and said blower, said changeover valve comprising a state selector handle for switching said changeover valve between ventilation and filtration states;
 b. powering on said electric motor driving the blower in any event requiring entrance into the protection shelter;
 c. observing said status indicator interface and adjusting said adjustment knob if required; and
 d. powering off said electric motor driving said blower, and leaving the protection shelter when back to normal or exit shelter is declared.

19. The method as claimed in claim 18 further comprising between steps c and d, the steps of:
 e. expanding said air exchange backup unit in an event of power failure, if the air exchange backup unit is not already expanded;
 f. attaching said second end of said air exchange backup unit to a wall of the protection shelter at a convenient position for manual cranking of said hand crank;
 g. attaching said detachable hand crank to said second end of said air exchange backup unit;
 h. cranking said hand crank while the power failure continues; and
 i. observing said status indicator interface and adjusting the cranking speed of said hand crank if required.

20. The method as claimed in claim 19 further comprising after step i the steps of:
 j. stopping the cranking operation when electric power is revived;
 k. detaching said detachable hand crank from said second end of said air exchange backup unit when back to normal or exit shelter is declared;
 l. Detaching said second end of said air exchange backup unit from the wall of the protection shelter; and
 m. folding up said air exchange backup unit.

21. The method as claimed in claim 18 further comprising between steps c and d, the steps of:
 n. switching said state selector handle to filtration state in an event of NBC hazard declaration; and o. switching said state selector handle back to ventilation state when NBC hazard declaration is canceled, and only if no contamination detected.

\* \* \* \* \*